United States Patent
Koda et al.

(10) Patent No.: US 8,991,831 B2
(45) Date of Patent: Mar. 31, 2015

(54) SPHERICAL ANNULAR SEAL MEMBER AND METHOD OF MANUFACTURING THE SAME

(75) Inventors: Yasuhiko Koda, Toyota (JP); Masanori Takahashi, Toyota (JP); Hidetoshi Kaida, Kanagawa (JP); Kouhei Kurose, Kanagawa (JP); Eiji Oki, Kanagawa (JP)

(73) Assignee: Oiles Corporation, Tokyo (JP)

( * ) Notice: Subject to any disclaimer, the term of this patent is extended or adjusted under 35 U.S.C. 154(b) by 533 days.

(21) Appl. No.: 13/391,946

(22) PCT Filed: Jul. 7, 2011

(86) PCT No.: PCT/JP2011/003916
§ 371 (c)(1),
(2), (4) Date: Feb. 23, 2012

(87) PCT Pub. No.: WO2012/042712
PCT Pub. Date: Apr. 5, 2012

(65) Prior Publication Data
US 2012/0211948 A1 Aug. 23, 2012

(30) Foreign Application Priority Data
Sep. 28, 2010 (JP) ................................. 2010-217980

(51) Int. Cl.
*F16J 15/12* (2006.01)
*F01N 13/18* (2010.01)
(Continued)

(52) U.S. Cl.
CPC ........... *F16J 15/126* (2013.01); *F01N 13/1827* (2013.01); *F16L 27/053* (2013.01); *F16L 27/073* (2013.01)
USPC ............................ 277/650; 277/651; 277/627

(58) Field of Classification Search
USPC .................................. 277/611, 627, 650–654
See application file for complete search history.

(56) References Cited

U.S. PATENT DOCUMENTS 5,698,498 A * 12/1997 Luciani et al. ................. 508/193
6,747,077 B2 * 6/2004 Gugumus et al. ............. 524/100
(Continued)

FOREIGN PATENT DOCUMENTS

JP 54-76759 6/1979
JP 58-034230 2/1983
(Continued)

OTHER PUBLICATIONS

International Search Report in PCT/JP2011/003916 mailed Sep. 13, 2011.

*Primary Examiner* — Gilbert Lee
(74) *Attorney, Agent, or Firm* — Nixon & Vanderhye P.C.

(57) ABSTRACT

A spherical annular seal member 39 includes a spherical annular base member 37 defined by annular end faces 35 and 36, and an outer layer 38 formed integrally on the spherical annular base member 37. The spherical annular base member 37 includes a reinforcing member 5 made from a metal wire net and a heat-resistant material 6 containing compressed expanded graphite. The outer layer 38 is comprised of a base layer 46 which includes a reinforcing member 15 made from a metal wire net and compressed and a heat-resistant material 14 containing expanded graphite, compressed in such a manner as to fill meshes of the metal wire net of the reinforcing member 15, and having a surface 52 which forms an outer-layer intermediate layer surface 42 together with the surface 41 of the reinforcing member 15, and of a heated sliding layer 40 of a molten fluororesin composition formed on the base layer 46 at the outer-layer intermediate layer surface 42. The surface 44 of the outer layer 38 exposed to the outside is constituted by a smooth surface 45 of the heated sliding layer 40.

8 Claims, 9 Drawing Sheets

(51) Int. Cl.
*F16L 27/053* (2006.01)
*F16L 27/073* (2006.01)

(56) References Cited

U.S. PATENT DOCUMENTS

2002/0077394 A1* 6/2002 Gugumus et al. ............. 524/100
2006/0287433 A1* 12/2006 Kanae et al. ................. 525/191
2010/0253011 A1 10/2010 Maeda et al.
2010/0270754 A1 10/2010 Kubota et al.

FOREIGN PATENT DOCUMENTS

| JP | 4-48973 | 8/1992 |
| JP | 06-123362 | 5/1994 |
| JP | 2003-206739 A | 7/2003 |
| JP | 2006-322601 | 11/2006 |
| WO | WO 2009/072295 A1 | 6/2009 |
| WO | WO 2009/078165 A1 | 6/2009 |
| WO | WO 2009078165 A1 * | 6/2009 |

* cited by examiner

SPHERICAL ANNULAR SEAL MEMBER AND METHOD OF MANUFACTURING THE SAME

This application is the U.S. national phase of International Application No. PCT/JP2011/003916 filed 7 Jul. 2011 which designated the U.S. and claims priority to JP 2010-217980 filed 28 Sep. 2010, the entire contents of each of which are hereby incorporated by reference.

TECHNICAL FIELD

The present invention relates to a spherical annular seal member used in a spherical pipe joint for an automobile exhaust pipe and a method of manufacturing the same.

BACKGROUND ART

FIG. 25 shows one example of an exhaust passage of an automobile engine, and exhaust gases generated in the respective cylinders (not shown) of the engine are gathered in an exhaust manifold catalyst converter 500 and are sent to a sub muffler 503 through an exhaust pipe 501 and an exhaust pipe 502. The exhaust gases which passed through this sub muffler 503 are further sent to a muffler 506 through an exhaust pipe 504 and an exhaust pipe 505, and are released to the atmosphere through this muffler 506.

Exhaust system members such as these exhaust pipes 501 and 502 as well as 504 and 505, the sub muffler 503, and the muffler 506 are subjected to repeated stress owing to such as the roll behavior and vibration of the engine. Particularly in the case of a high-speed rotation and high-output engine, the stress applied to the exhaust system members becomes quite large. Accordingly, the exhaust system members have a possibility of bringing about a fatigue failure, and the engine vibration can cause the exhaust system members to resonate, thereby deteriorating compartment quietness in some cases. To overcome these problems, a connecting portion 507 between the exhaust manifold catalyst converter 500 and the exhaust pipe 501 and a connecting portion 508 between the exhaust pipe 504 and the exhaust pipe 505 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior.

PRIOR ART DOCUMENTS

Patent Documents

Patent Document 1: JP-A-54-76759
Patent Document 2: JP-B-4-48973
Patent Document 3: JP-A-58-34230
Patent Document 4: JP-A-6-123362

SUMMARY OF THE INVENTION

Problems to be Solved by the Invention

As one example of the above-described vibration absorbing mechanism, it is possible to cite an exhaust pipe joint described in Patent Document 1 and an exhaust seal which is used in that joint. The exhaust seal described in this Patent Document 1 has advantages in that it is heat resistant, excels in affinity with a mating member, and has remarkably improved impact strength; however, the exhaust seal has a drawback in that it often generates abnormal noise when it undergoes friction under dry frictional conditions. The drawback of this exhaust seal is conceivably attributable to, among others, the fact that there is a large difference between the coefficient of static friction and the coefficient of dynamic friction of a heat-resistant material (such as expanded graphite) for forming that seal, and to the fact that the frictional resistance of the exhaust seal constituted by this heat-resistant material exhibits negative resistance with respect to its sliding velocity.

As the seal member for overcoming the drawbacks of the above-described seal member, one disclosed in Patent Document 2 is known. This seal member is formed by superposing a reinforcing member made from a metal wire net on a sheet-like heat-resistant material made from expanded graphite with a polytetrafluoroethylene resin filled therein and coated thereon, so as to form a belt-shaped composition, by convoluting the belt-shaped composition such that the surface with the polytetrafluoroethylene resin filled therein and coated thereon is placed on the outer side, so as to form a hollow cylindrical laminate, and by subjecting the hollow cylindrical laminate to compression molding along the axial direction of the laminate. Thus, a seal member is described in which the surface with the polytetrafluoroethylene resin filled therein and coated thereon is exposed on the outer peripheral surface constituting a sliding surface (sealing surface). As for this seal member, the polytetrafluoroethylene resin coated and formed on the surface exhibits operational effects such as the reduction of the coefficient of friction and the prevention of transfer of the heat-resistant material for forming the base member onto the surface of a mating member. Further, since the frictional resistance of the polytetrafluoroethylene resin does not exhibit negative resistance with respect to the sliding velocity, an additional effect is obtained in that the generation of self-excited vibration based on the stick-slip phenomenon (adhesion-slippage) can be suppressed, coupled with the above-described operational effects, thereby contributing to the prevention of generation of abnormal frictional noise.

The seal member described in the above-described Patent Document 2 overcomes the problems of the exhaust seal described in the above-described Patent Document 1. However, the effect that the generation of self-excited vibration based on the stick-slip phenomenon is suppressed and a contribution is thereby made to the prevention of generation of abnormal frictional noise, which is an operational effect of the seal member disclosed in Patent Document 2, is limited to the use in which the ambient temperature acting on the seal member is the melting point (327° C.) or below of the polytetrafluoroethylene resin, and, in the use at an ambient temperature exceeding that melting point, the abnormal frictional noise attributable to the stick-slip phenomenon occasionally occurs inevitably.

Namely, after the start of traveling of the automobile, the seal member coated with the polytetrafluoroethylene resin forms a film of the polytetrafluoroethylene resin on the surface of the mating member by coming into sliding contact with the mating member (concave spherical surface member), and the sliding shifts to that between films of the polytetrafluoroethylene resin, so that a state of sliding contact is maintained with low friction and which is free from the abnormal frictional noise. As the automobile further travels, when the temperature of the mating member rises and eventually reaches a temperature exceeding the melting point of the polytetrafluoroethylene resin, the films of the polytetrafluoroethylene resin melt. When traveling is stopped, the temperature of the mating member drops, and both films adhere to each other. If traveling is started again in the state in which both of these films have become adhered, since the melt viscosity of the polytetrafluoroethylene resin is very high, a large shearing force acts, and if the adhesion phenomenon is canceled, large abnormal frictional noise is generated on the basis of the cancellation of the adhesion phenomenon, i.e., abnormal frictional noise is generated by the stick-slip phenomenon due to the fact that the difference between the coefficient of static friction and the coefficient of dynamic friction becomes large. This stick-slip phenomenon also occurs in the seal member having a coating layer consisting of a polytetrafluoroethylene resin composition having the polytetrafluoroethylene resin as its principal component.

With respect to such a stick-slip phenomenon, in Patent Documents 3 and 4, spherical annular seal members are proposed which are each comprised of: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member. In these proposed spherical annular seal members, the spherical annular base member includes a reinforcing member made from a metal wire net and a heat-resistant material filling meshes of the metal wire net of the reinforcing member, compressed in such a manner as to be formed integrally with the reinforcing member in mixed form, and containing expanded graphite. In the outer layer, the lubricating material and the heat-resistant material, on the one hand, and the reinforcing member made from the metal wire net, on the other hand, are compressed such that the lubricating material and the heat-resistant material are filled in the meshes of the metal wire net of that reinforcing member, and the lubricating material and the heat-resistant material are integrated with the reinforcing member in mixed form, the outer surface of the outer layer being thus formed into a smooth sliding surface in which a surface constituted by the reinforcing member and a surface constituted by the lubricating material are present in mixed form.

Such spherical annular seal members described in Patent Documents 3 and 4 offer the following advantages: Since the outer surface of the outer layer is formed into a smooth sliding surface in which the surface constituted by the reinforcing member and the surface constituted by the lubricating material are present in mixed form, as described above, it is possible to ensure smooth sliding between that outer surface and the concave spherical surface portion of the exhaust pipe which is the mating member brought into sliding contact therewith. In addition, in the sliding friction between that outer surface and the concave spherical surface portion, the transfer of the lubricating material from that outer surface onto the surface of the concave spherical surface portion is effected to form on the concave spherical surface portion a lubricating film constituted by the lubricating material, while even if the transfer of the lubricating material onto the concave spherical surface portion is effected excessively, the reinforcing member exposed in a dotted manner on the outer surface exhibits a scraping effect while leaving an appropriate lubricating film, so that sliding friction with the mating member shifts to that with the lubricating film formed on the surface of the mating member, and therefore abnormal frictional noise is not generated.

The spherical annular seal members described in Patent Documents 3 and 4 have the above-described advantages. However, in the event that very small swinging motions or excessive axial loads are applied to the spherical annular seal member continuously for long periods of time, the reinforcing member made from the metal wire net exposed on the outer layer of the spherical annular seal member can attack the surface of the mating member and induce abrasive wear, thereby possibly damaging or roughening the surface of the mating material and causing sealability to decline appreciably. Furthermore, in conjunction with the shift to the abrasive wear, the friction shifts to that through wear dust accumulated on the frictional surfaces of the spherical annular seal member and the mating member, thereby possibly inducing the generation of abnormal frictional noise.

Focusing attention on the outer layer of the spherical annular seal member serving as a frictional sliding surface with the mating member, the present inventors found organic relationships between the heat-resistant material and the reinforcing member and with the sliding layer, such as the rate of exposure of the reinforcing member in the outer layer of the spherical annular seal member, the degree of adhesion between the reinforcing member and the heat-resistant material made from the expanded graphite, the relative size of the wire diameter of a fine metal wire for forming the metal wire net of the reinforcing member, and the sliding layer formed on the outer surface of the outer layer, and thereby obtained a finding that the above-described problems can be overcome by improving these relationships.

The present invention has been devised on the basis of the above-described finding, and its object is to provide a spherical annular seal member and a method of manufacturing the same which are capable of preventing a decline in sealability and the generation of abnormal frictional noise without damaging or roughening the surface of the mating member in the sliding friction with the mating member.

Means for Overcoming the Problems

A spherical annular seal member which is used as an exhaust pipe joint comprises: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite and compressed in such a manner as to fill meshes of the metal wire net of the reinforcing member and to be integrated with the reinforcing member in mixed form, and the outer layer is comprised of a base layer which includes a reinforcing member made from a metal wire net and compressed and a heat-resistant material containing expanded graphite, compressed in such a manner as to fill meshes of the metal wire net of the reinforcing member and to be tightly pressure bonded to the reinforcing member, and having a surface which is flush with a surface of the reinforcing member and forms an outer-layer intermediate layer surface together with that surface, the base layer being formed integrally with the partial convex spherical surface, and of a heated sliding layer constituted by a molten fluororesin composition which is integrally adhered to and formed on the base layer at the outer-layer intermediate layer surface and contains at least a molten fluororesin, a surface of the outer layer exposed to an outside being constituted by a smooth surface of the heated sliding layer.

According to the spherical annular seal member in accordance with the present invention, the molten fluororesin for forming the heated sliding layer of the molten fluororesin composition formed integrally on the base layer at the outer-layer intermediate layer surface has a low molten viscosity, and the difference between the coefficient of static friction and the coefficient of dynamic friction of that heated sliding layer is small, so that the stick-slip phenomenon does not occur. Therefore, it is possible to prevent the generation of abnormal frictional noise attributable to the stick-slip phenomenon. In addition, even in a case where the heated sliding layer has become worn away in the sliding friction with the mating member, the sliding friction shifts to that with the surface in which the heat-resistant material constituted by expanded graphite is dotted with parts of the reinforcing member, so that direct friction with only the heat-resistant material made from expanded graphite is avoided. Hence, the stick-slip phenomenon does not occur which is attributable to the large difference between the coefficient of static friction and the coefficient of dynamic friction of the heat-resistant material, thereby making it possible to prevent the generation of abnormal frictional noise due to the stick-slip phenomenon.

In the spherical annular seal member in accordance with the present invention, a surface of the outer-layer intermediate layer surface of the base layer formed by the reinforcing member and the heat-resistant material in the outer layer may be formed with an arithmetic mean roughness Ra of 5 to 30 μm.

Since the surface of the outer-layer intermediate layer surface is formed with an arithmetic mean roughness Ra of 5 to 30 μm, the bonding force of the heated sliding layer of the molten fluororesin composition, which is adhered to and formed on that outer-layer intermediate layer surface, with respect to that outer-layer intermediate layer surface can be enhanced.

In the spherical annular seal member in accordance with the present invention, the molten fluororesin composition may contain 23 to 75% by mass of a hexagonal boron nitride (hereinafter abbreviated as "h-BN") and 23 to 75% by mass of a molten fluororesin, and the molten fluororesin composition may further contain graphite (hereinafter abbreviated as "Gr") at a ratio of not more than 16% by mass.

A tetrafluoroethylene-hexafluoropropylene copolymer (hereinafter abbreviated as "FEP") may suitably be used as the molten fluororesin in the molten fluororesin composition for forming the heated sliding layer. In terms of its melt viscosity, the FEP exhibits $1 \times 10^{3\text{-}4}$ Pa·s (poise) at 380° C., and this melt viscosity is far smaller than the melt viscosity of a polytetrafluoroethylene resin (hereinafter abbreviated as "PTFE") which exhibits $1 \times 10^{10\text{-}11}$ Pa·s (poise) at 340 to 380° C. Hence, the difference between the coefficient of static friction and the coefficient of dynamic friction is small, so that the stick-slip phenomenon is not generated, making it possible to prevent the generation of abnormal frictional noise ascribable to the stick-slip phenomenon.

In the spherical annular seal member in accordance with the present invention, the metal wire nets of the reinforcing members for the outer layer and for the spherical annular base member are each made from, for example, a woven metal wire net or a knitted metal wire net which is obtained by weaving or knitting a fine metal wire. As the fine metal wires for forming the woven metal wire net and the knitted metal wire net, fine metal wires whose diameters are in a range of 0.15 to 0.32 mm, more specifically fine metal wires whose diameters are 0.15 mm, 0.175 mm, 0.28 mm, or 0.32 mm, are suitable. In addition, as the metal wire nets of the reinforcing members for the spherical annular base member and for the outer layer, it is possible to use woven metal wire nets or knitted metal wire nets made from a fine metal wire of the same diameter. Alternatively, a woven metal wire net or a knitted metal wire net made from a fine metal wire having the wire diameter of 0.28 to 0.32 mm on the upper limit side of the aforementioned range may be used as the metal wire net of the reinforcing member for the spherical annular base member, and a woven metal wire net or a knitted metal wire net made from a fine metal wire having the wire diameter of 0.15 to 0.175 mm on the lower limit side of the aforementioned range may be used as the metal wire net of the reinforcing member for the outer layer.

A method of manufacturing a spherical annular seal member for use as an exhaust pipe joint and including a spherical annular base member defined by a cylindrical inner surface, a partially convex spherical surface, and large- and small-diameter side annular end faces of the partially convex spherical surface, and an outer layer formed integrally on the partially convex spherical surface of the spherical annular base member, comprises the steps of: (a) preparing a heat-resistant material for a spherical annular base member constituted by an expanded graphite sheet having a density of $\alpha$ Mg/m³; (b) preparing a reinforcing member for the spherical annular base member made from a metal wire net which is obtained by weaving or knitting a fine metal wire, and, after forming a superposed assembly by superposing the reinforcing member for the spherical annular base member on the heat-resistant material for the spherical annular base member, convoluting the superposed assembly into a hollow cylindrical shape to thereby form a tubular base member; (c) inserting a heat-resistant material for an outer layer constituted by an expanded graphite sheet having a density of $0.3\alpha$ to $0.6\alpha$ Mg/m³ between two layers of a reinforcing member for the outer layer made from a metal wire net which is obtained by weaving or knitting a fine metal wire, and pressurizing the reinforcing member for the outer layer with the heat-resistant material for the outer layer inserted therein in a thicknesswise direction of the reinforcing member, to thereby form a flattened composite sheet member in which the heat-resistant material for the outer layer and the reinforcing member for the outer layer are compressed so as to be pressure bonded to each other, such that the heat-resistant material for the outer layer is tightly filled in meshes of the metal wire net of the reinforcing member for the outer layer and the reinforcing member for the outer layer is embedded in the heat-resistant material for the outer layer while exposing parts thereof, the flattened composite sheet member having a surface in which a surface of the heat-resistant material for the outer layer and a surface of the reinforcing member for the outer layer are flush with each other; (d) preparing an aqueous dispersion of a molten fluororesin composition containing a molten fluororesin powder, a hexagonal boron nitride powder, a surfactant, and water; (e) applying the aqueous dispersion to the surface of the composite sheet member in which the surface of the heat-resistant material for the outer layer and the surface of the reinforcing member for the outer layer are made flush with each other, and drying the aqueous dispersion, to thereby form a coating layer of the molten fluororesin composition on that surface; (f) heating the coating layer of the molten fluororesin composition formed on the surface of the composite sheet member at a temperature of not less than a melting point of a molten fluororesin, to thereby form a flattened outer-layer forming member having a heated coating layer of the molten fluororesin composition on one surface of the composite sheet member; (g) convoluting the outer-layer forming member around an outer peripheral surface of the tubular base member with its heated coating layer facing outside to thereby form a cylindrical preform; and (h) fitting the cylindrical preform over an outer peripheral surface of a core of a die, placing the core in the die, and subjecting the cylindrical preform to compression molding in the die in an axial direction of the core, wherein the spherical annular base member is constructed so as to be provided with structural integrity as the heat-resistant material for the spherical annular base member containing expanded graphite and the reinforcing member for the spherical annular base member made from the metal wire net are compressed and intertwined with each other, and the outer layer is comprised of a base layer which includes the reinforcing member made from the metal wire net and compressed and the heat-resistant material containing expanded graphite, compressed in such a manner as to fill meshes of the metal wire net of the reinforcing member and to be tightly pressure bonded to the reinforcing member, and having a surface which is flush with a surface of the reinforcing member dotted with the reinforcing member and forms an outer-layer intermediate layer surface together with that surface, the base layer being formed integrally with the partial convex spherical surface, and of a heated sliding layer obtained by heating a molten fluororesin composition which is integrally adhered to and formed on the base layer at the outer-layer intermediate layer surface, a surface of the outer layer exposed to an outside being constituted by a smooth surface of the heated sliding layer.

According to the method of manufacturing a spherical annular seal member in accordance with the present invention, the heat-resistant material for the outer layer constituted by the expanded graphite sheet having a density lower than the density of the expanded graphite sheet for forming the heat-resistant material for the spherical annular base member is inserted between two layers of the reinforcing member made from a metal wire net, and such a reinforcing member for the outer layer with the heat-resistant material for the outer layer inserted therein is pressurized in the thicknesswise direction of that reinforcing member, whereby the heat-resistant material for the outer layer and the reinforcing member for the outer layer are pressure bonded to each other such that the heat-resistant material for the outer layer is tightly filled in the meshes of the metal wire net of the reinforcing member for the outer layer, and the reinforcing member for the outer layer is embedded in the heat-resistant material for the outer layer. Thus, it is possible to form a flattened composite sheet member in which the surface of the heat-resistant material for the outer layer and the surface of the reinforcing member for the outer layer are flush with each other, and the surface of that reinforcing member for the outer layer made mutually flush is exposed in a dotted manner on the surface of the reinforcing member for the outer layer.

In this flattened composite sheet member, the surface of the heat-resistant material for the outer layer and the surface of the reinforcing member for the outer layer are flush with each other, the reinforcing member for the outer layer is exposed in a dotted manner on the surface of the reinforcing member for the outer layer and the surface of the heat-resistant material for the outer layer which are made flush with each other, and the arithmetic mean roughness Ra of that exposed surface may be formed to be 5 to 30 μm.

In the outer layer formed by this composite sheet member, even in the case where the outer layer is integrally formed with the partially convex spherical surface of the spherical annular base member, its outer-layer intermediate layer surface is dotted with the reinforcing member. Therefore, in the friction with the mating member after the wearing away of the heated sliding layer, it is possible to avoid direct friction with only the heat-resistant material made from expanded graphite. Hence, the stick-slip phenomenon does not occur which is attributable to the large difference between the coefficient of static friction and the coefficient of dynamic friction of the heat-resistant material, thereby making it possible to prevent the generation of abnormal frictional noise due to that stick-slip phenomenon. Furthermore, since it is possible to avoid local friction of only the reinforcing member of the outer layer with the surface of the mating member and prevent the damaging and roughening of the surface of the mating member due to friction, it is possible to prevent a decline in sealability. In addition, since the friction takes place through the film of an appropriate thickness formed on the surface of the mating member by virtue of the action of scraping off the excessive film formed on the surface of the mating member, it is possible to prevent the generation of abnormal frictional noise.

In this flattened composite sheet member, in the case where a woven metal wire net or a knitted metal wire net made from a fine metal wire having the wire diameter of 0.28 to 0.32 mm is used as the metal wire net of the reinforcing member for the outer layer, in the pressurization in the thicknesswise direction of the heat-resistant material of the reinforcing member for the outer layer with the heat-resistant material for the outer layer inserted therein, a method is suitably used in which the reinforcing member with the heat-resistant material inserted therein is pressurized by being fed into, for example, a nip between a cylindrical roller having a smooth cylindrical outer peripheral surface and a roller having a cylindrical outer peripheral surface with a plurality of annular recessed grooves along the axial direction, and is subsequently further fed into a nip between another pair of cylindrical rollers each having a smooth cylindrical outer peripheral surface. Furthermore, in the case where a woven metal wire net or a knitted metal wire net made from a fine metal wire having the wire diameter of 0.150 to 0.175 mm, is used as the metal wire net of the reinforcing member for the outer layer, in the pressurization in the thicknesswise direction of the heat-resistant material of the reinforcing member for the outer layer with the heat-resistant material for the outer layer inserted therein, a method is suitably used in which the reinforcing member with the heat-resistant material inserted therein is fed into, for example, a nip between at least one pair of cylindrical rollers each having a smooth cylindrical outer peripheral surface. It should be noted that it goes without saying that even in a case where a woven metal wire net or a knitted metal wire net made from a fine metal wire having the wire diameter of 0.28 to 0.32 mm is used as the metal wire net of the reinforcing member for the outer layer, it is also possible to adopt the latter method, and that even in a case where a woven metal wire net or a knitted metal wire net made from a fine metal wire having the wire diameter of 0.150 to 0.175 mm is used as the metal wire net of the reinforcing member for the outer layer, it is also possible to adopt the former method.

In the method of manufacturing a spherical annular seal member in accordance with the present invention, in a preferred example, the density α of the heat-resistant material for the spherical annular base member is 1.0 to 1.5 Mg/m$^3$, preferably 1.0 to 1.2 Mg/m$^3$. The density of the heat-resistant material for the outer layer in a preferred example is 0.3 to 0.6 times the density of the heat-resistant material for the spherical annular base member, i.e., 0.3 to 0.9 Mg/m$^3$, more preferably 0.3 to 0.7 Mg/m$^3$.

The surface roughness of the flattened composite sheet member obtained through the above-described step (c) in a preferred example is 5 to 30 μm in the arithmetic mean roughness Ra.

Even in the case where the outer layer formed by this composite sheet member is integrally formed with the partially convex spherical surface of the spherical annular base member, since the reinforcing member for the outer layer is exposed in a dotted manner on the outer-layer intermediate layer surface of the outer layer and the surface roughness of the outer-layer intermediate layer surface of the outer layer is 5 to 30 μm in the arithmetic mean roughness Ra, local friction with the surface of the mating member is prevented as practically as possible in the friction with the surface of the mating member, and damaging and roughening of the surface of the mating member can be avoided as practically as possible. As a result, the advantage is obtained that it is possible to minimize the amount of gas leakage from between the frictional surfaces of the spherical annular seal member and the mating member.

The aqueous dispersion of the molten fluororesin composition for coating the one surface of the composite sheet member is composed of a molten fluororesin powder with a particle size of 0.01 to 1 μm which is obtained by an emulsion polymerization method, an h-BN powder with a particle size of 0.01 to 1 μm, a surfactant, and water. A Gr powder may be further contained in this aqueous dispersion, and an aqueous organic solvent may be contained in this aqueous dispersion. As this aqueous dispersion, one which has a ratio of 50% by mass of a solid content and 50% by mass of a water content is preferable.

The FEP is used as the molten fluororesin. In terms of its melt viscosity, the FEP exhibits $1 \times 10^{3-4}$ Pa·s (poise) at 380° C. The content of the FEP powder which is contained in the aqueous dispersion (50% by mass of the solid content) is 11.5 to 45% by mass, preferably 11.5 to 33% by mass.

The content of the h-BN powder which is contained in the aqueous dispersion (50% by mass of the solid content) is 11.5 to 45% by mass, preferably 11.5 to 25% by mass. The h-BN exhibits excellent lubricity particularly in a high-temperature range.

The aqueous dispersion (50% by mass of the solid content) containing the above-described FEP powder and h-BN powder may further contain 0.5 to 8% by mass, preferably 1 to 5% by mass, of a Gr powder. The Gr powder improves film formability of the sliding layer constituted by the molten fluororesin composition onto the surface of the mating member.

The surfactant is sufficient if it is capable of uniformly dispersing the FEP powder in water, and it is possible to use any one of an anionic surfactant, a cationic surfactant, a nonionic surfactant, and an amphoteric surfactant. It is possible to cite, for example, anionic surfactants such as sodium alkyl sulfate, sodium alkyl ether sulfate, triethanol amine alkyl sulfate, triethanol amine alkyl ether sulfate, ammonium alkyl sulfate, ammonium alkyl ether sulfate, alkyl ether sodium phosphate, and sodium fluoroalkyl carboxylate; cationic surfactants such as alkyl ammonium salt and alkyl benzyl ammonium salt; nonionic surfactants such as polyoxyethylene alkyl ether, polyoxyethylene phenyl ether, polyoxyethylene alkyl ester, propylene glycol-propylene oxide copolymer, perfluoroalkyl ethylene oxide additive, and 2-ethyl-hexanol ethylene oxide additive; and amphoteric surfactants such as alkylaminoacetic acid betaine, alkylamidoacetic acid betaine, and imidazolium betaine. In particular, anionic and nonionic surfactants are preferable. Particularly preferable surfactants are nonionic surfactants having an oxyethylene chain in which the amount of pyrolytic residue is small.

The content of the surfactant is normally 0.1 to 30% by mass, particularly preferably 0.2 to 20% by mass, of the FEP powder. If the content of the surfactant is excessively small, the dispersion of the FEP powder does not become uniform, whereas if the content of the surfactant is excessively large, the pyrolytic residue of the surfactant due to heating becomes large and coloration takes place, additionally resulting in a decline in the heat resistance, nonadhesiveness, and the like of the coating layer.

An aqueous organic solvent may be further contained in the aqueous dispersion comprised of the FEP powder, the h-BN powder, the surfactant, and water described above. For example, it is possible to cite alcohol-based solvents such as methanol, ethanol, butanol, isopropyl alcohol, and glycerin; ketone-based solvents such as acetone, methylethyl ketone, and methylisobutyl ketone; ether-based solvents such as methyl cellosolve, cellosolve, and butyl cellosolve; glycol-based solvents such as ethylene glycol, propylene glycol, triethylene glycol, and tetraethylene glycol; amide-based solvents such as dimethylformamide and dimethylacetamide; and lactam-based solvents such as N-methyl-2-pyrrolidone. The content of the aqueous organic solvent is 0.5 to 50% by weight, preferably 1 to 30% by weight, of the total amount of water. The aqueous organic solvent has the function of wetting the FEP and forms a uniform mixture with h-BN, and since it evaporates during heating, it does not adversely affect the coating.

The aqueous dispersion of the molten fluororesin composition in terms of its component composition in a preferred example contains 11.5 to 45% by mass of an FEP powder with a particle size of 0.01 to 1 μm, 11.5 to 45% by mass of an h-BN powder with a particle size of 0.01 to 1 μm, 0.01 to 13.5% by mass of a surfactant, and water (25 to 45% by mass). The aqueous dispersion of the molten fluororesin composition in terms of its component composition may further contain 0.5 to 8% by mass of a graphite powder, and may contain 0.1 to 22.5% by mass of an aqueous organic solvent.

In the method of manufacturing a spherical annular seal member in accordance with the present invention, the coating layer constituted by the molten fluororesin composition formed by applying the aqueous dispersion to one surface of the composite sheet member by means of roller coating, brushing, spraying, or the like is dried at a temperature of 100° C., and, in a preferred example, is subsequently heated in a heating furnace. The heating temperature in one example is in a range of the melting point (T) of the FEP to (T+150° C.), preferably (T+5° C.) to (T+135° C.), more preferably (T+10° C.) to (T+125° C.). Since the melting point of the FEP is 240° C., the heating temperature in one example falls within a range of 240 to 390° C., preferably 245 to 375° C., more preferably 250 to 365° C. If the heating temperature is excessively low, it becomes difficult to form a uniform coating layer of the molten fluororesin composition, whereas if the heating temperature is excessively high, the thermal deterioration of the molten fluororesin composition is liable to occur.

On the one surface of the composite sheet member which is coated with the aqueous dispersion of the molten fluororesin composition, the reinforcing member is exposed in a dotted manner on the one surface of the composite sheet member, and since its arithmetic mean roughness Ra is 5 to 30 μm, the heated coating layer of the molten fluororesin composition after heating is firmly bonded to the one surface of the composite sheet member.

Advantages of the Invention

According to the present invention, it is possible to provide a spherical annular seal member and a method of manufacturing the same which are capable of preventing a decline in sealability and the generation of abnormal frictional noise without damaging or roughening the surface of the mating member in the sliding friction with the mating member.

MODE FOR CARRYING OUT THE INVENTION

Figure 1:
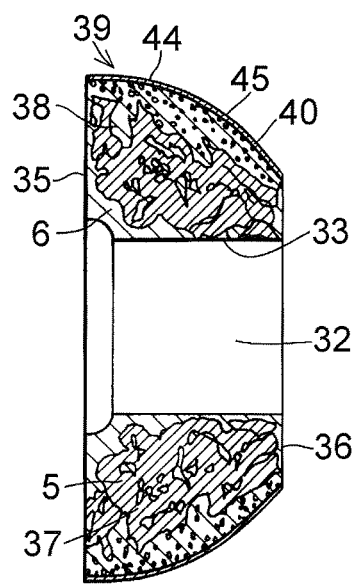
FIG. 1 is a vertical cross-sectional view of a spherical annular seal member which is manufactured in one embodiment of the present invention.

Next, a more description will be given of the present invention on the basis of the preferred embodiments illustrated in the drawings. It should be noted that the present invention is not limited to these embodiments.

A description will be given of constituent materials of a spherical annular seal member and a method of manufacturing the spherical annular seal member in accordance with the invention.

<Concerning Heat-Resistant Material and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to the reaction solution, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this is used as an acid-treated graphite powder.

The above-described acid-treated graphite powder is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet having a desired thickness. This expanded graphite sheet is used as a heat-resistant material.

In the above-described heat-resistant material, for use as a spherical annular base member, a heat-resistant material is preferably used whose density at the time of manufacturing the spherical annular seal member is 1.0 to 1.5 Mg/m$^3$, preferably 1.0 to 1.2 Mg/m$^3$. In addition, for use as the outer layer, a heat-resistant material is preferably used whose density is 0.3 to 0.6 times the density of the heat-resistant material used for the above-described spherical annular base member at the time of manufacturing the spherical annular seal member, i.e., a density of 0.3 to 0.9 Mg/m$^3$, preferably 0.3 to 0.7 Mg/m$^3$.

<Concerning Reinforcing Member>

As a reinforcing member, a woven or knitted metal wire net is used which is formed by weaving or knitting one or more fine metal wires including, as an iron-based wire, a stainless steel wire made of such as austenitic stainless steels SUS 304, SUS 310, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

Figure 5:
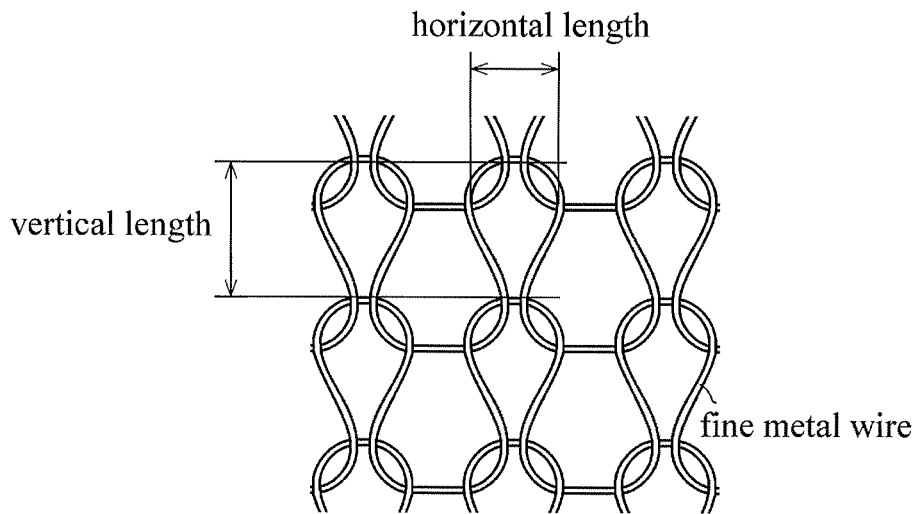
FIG. 5 is a plan view illustrating meshes of a metal wire net of the reinforcing member.

As the fine metal wire for forming the metal wire net, a fine metal wire whose diameter is in a range of 0.15 to 0.32 mm, specifically a fine metal wire whose diameter is 0.15 mm, 0.175 mm, 0.28 mm, or 0.32 mm, is preferably used. In terms of the mesh size of the woven metal wire net or knitted metal wire net formed by the fine metal wire of that diameter, a metal wire net is preferably used whose mesh size is 4 to 6 mm long and 3 to 5 mm wide or thereabouts as in FIG. 5 illustrating a knitted metal wire net.

<Concerning Molten Fluororesin Composition>

A molten fluororesin composition for forming a coating layer (sliding layer) is used in the following forms: (1) an aqueous dispersion composed of 11.5 to 45% by mass of an FEP powder, 11.5 to 45% by mass of an h-BN powder with a particle size of 0.01 to 1 μm, 0.01 to 13.5% by mass of a surfactant, and the balance of water, (2) an aqueous dispersion composed of 11.5 to 45% by mass of an FEP powder, 11.5 to 45% by mass of an h-BN powder with a particle size of 0.01 to 1 μm, 0.5 to 8% by mass of a graphite powder, 0.01 to 13.5% by mass of a surfactant, and the balance of water, (3) an aqueous dispersion composed of 11.5 to 45% by mass of an FEP powder, 11.5 to 45% by mass of an h-BN powder with a particle size of 0.01 to 1 μm, 0.01 to 13.5% by mass of a surfactant, 0.1 to 22.5% by mass of an aqueous organic solvent, and the balance of water, and (4) an aqueous dispersion composed of 11.5 to 45% by mass of an FEP powder, 11.5 to 45% by mass of an h-BN powder with a particle size of 0.01 to 1 μm, 0.5 to 8% by mass of a graphite powder, 0.01 to 13.5% by mass of a surfactant, 0.1 to 22.5% by mass of an aqueous organic solvent, and the balance of water.

Next, referring to the drawings, a description will be given of a method of manufacturing a spherical annular seal member composed of the above-described constituent materials.

Figure 3:
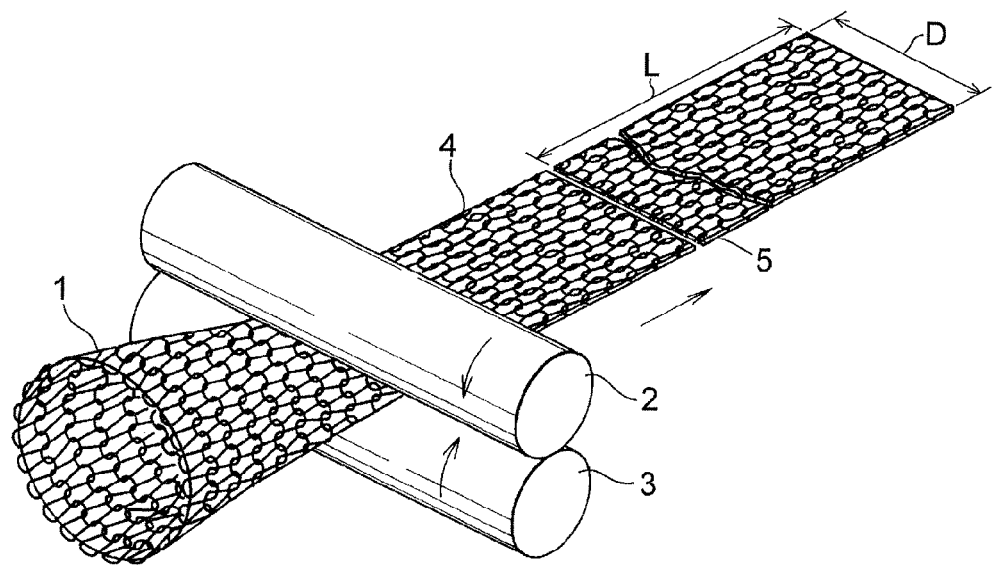
FIG. 3 is a diagram explaining a method of forming a reinforcing member in a process of manufacturing the spherical annular seal member in accordance with the present invention.

(First Process) As shown in FIG. 3, a hollow cylindrical knitted metal wire net 1, which is formed by knitting a fine metal wire with a diameter of 0.15 to 0.32 mm, preferably a diameter of 0.28 to 0.32 mm, into a cylindrical shape and whose mesh size is 4 to 6 mm long and 3 to 5 mm wide or thereabouts (see FIG. 5), is passed between rollers 2 and 3, thereby fabricating a belt-shaped metal wire net 4 having a predetermined width D. A reinforcing member 5 for the spherical annular base member is then prepared by cutting the belt-shaped metal wire net 4 into a predetermined length L.

Figure 4:
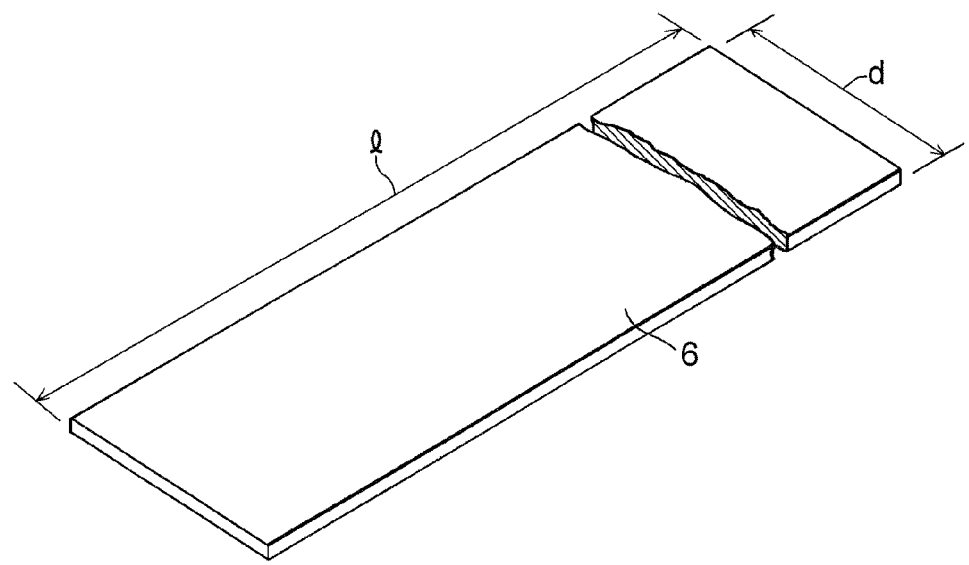
FIG. 4 is a perspective view of a heat-resistant material in the process of manufacturing the spherical annular seal member in accordance with the present invention.

(Second Process) As shown in FIG. 4, a heat-resistant material 6 for the spherical annular base member is prepared whose density is 1.0 to 1.5 Mg/m$^3$, preferably 1.0 to 1.2 Mg/m$^3$, so as to have a width d of from (1.10×D) mm to (2.10×D) mm with respect to the width D of the above-described reinforcing member 5 and a length l of (1.30×L) mm to (2.70×L) mm with respect to the length L of the reinforcing member 5.

Figure 6:
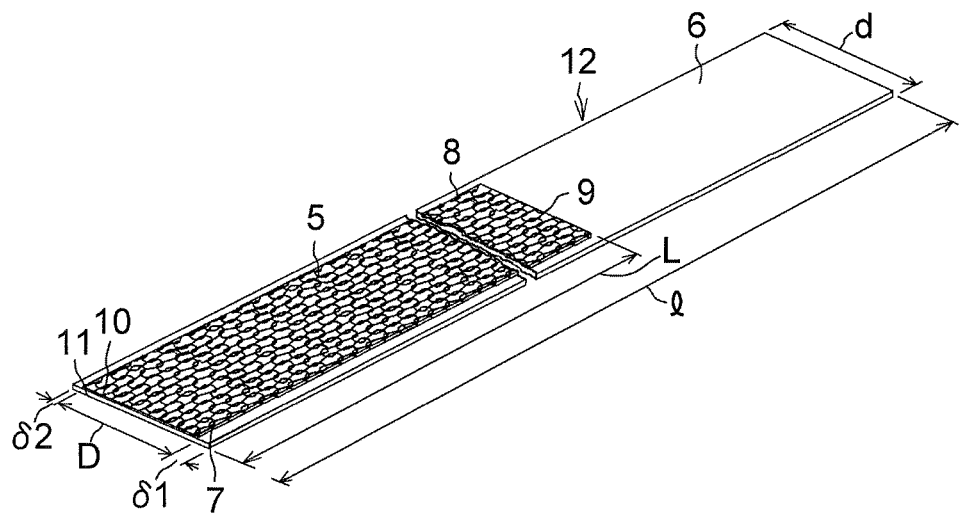
FIG. 6 is a perspective view of a superposed assembly in the process of manufacturing the spherical annular seal member in accordance with the present invention.

(Third Process) A superposed assembly 12 in which the heat-resistant material 6 and the reinforcing member 5 are superposed one on top of the other is prepared as follows: To ensure that the heat-resistant material 6 is wholly exposed on a large-diameter side annular end face 35 of a partially convex spherical surface 34 in a below-described spherical annular seal member 39 (see FIG. 1), as shown in FIG. 6, the heat-resistant material 6 is made to project in the widthwise direction by a maximum of (0.10 to 0.80)×D mm from one widthwise end 7 of the reinforcing member 5, which serves as the large-diameter side annular end face 35 of the partially convex spherical surface 34. Also, the amount of widthwise projection, δ1, of the heat-resistant material 6 from the end 7 is made greater than the amount of its widthwise projection, δ2, from the other widthwise end 8 of the reinforcing member 5, which serves as a small-diameter side annular end face 36 of the partially convex spherical surface 34. Further, the heat-resistant material 6 is made to project in the longitudinal direction by a maximum of (0.30 to 1.70)×L mm from one longitudinal end 9 of the reinforcing member 5, while the other longitudinal end 10 of the reinforcing member 5 and a longitudinal end 11 of the heat-resistant material 6 corresponding to that end 10 are made to agree with each other.

Figure 7:
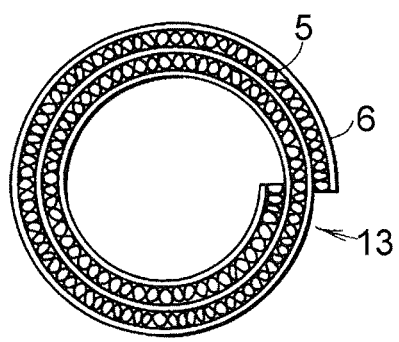
FIG. 7 is a plan view of a tubular base member in the process of manufacturing the spherical annular seal member in accordance with the present invention.
Figure 8:
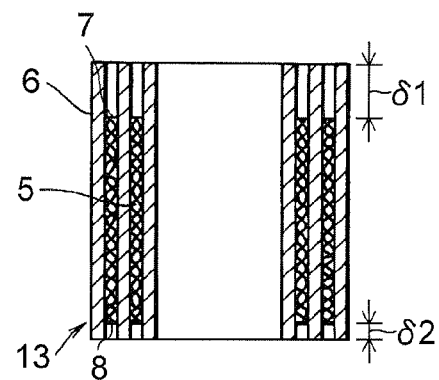
FIG. 8 is a vertical cross-sectional view of the tubular base member shown in FIG. 7.

(Fourth Process) As shown in FIG. 7, the superposed assembly 12 is convoluted with the heat-resistant material 6 placed on the inner side such that heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of from (1.30×L) mm to (2.70×L) mm with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the heat-resistant material 6 on its one widthwise end side projects in the widthwise direction by δ1 from the one end 7 of the reinforcing member 5, and the heat-resistant material 6 on its other widthwise end side projects in the widthwise direction by δ2 from the other end 8 of the reinforcing member 5.

(Fifth Process) Another heat-resistant material for the outer layer whose density is 0.3 to 0.9 Mg/m$^3$, preferably 0.3 to 0.6 Mg/m$^3$ is prepared.

(Sixth Process)

Figure 9:
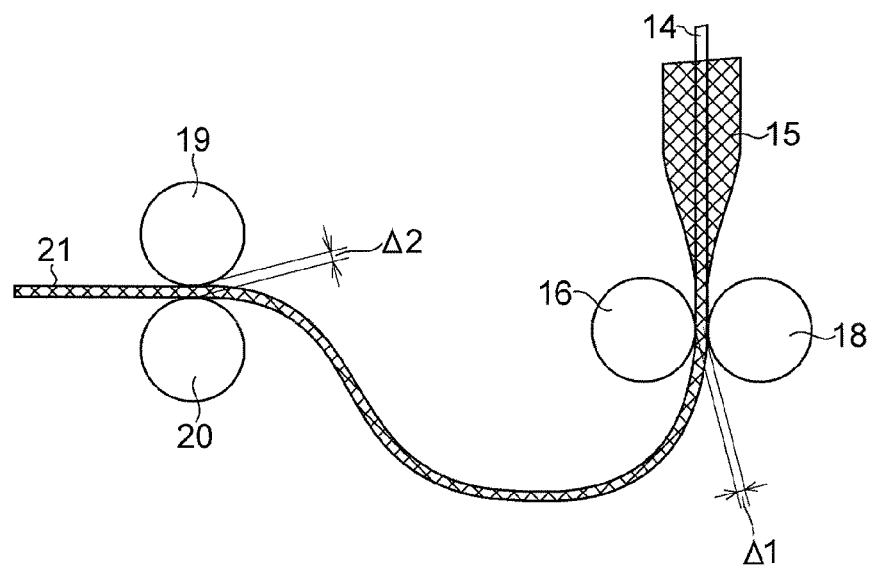
FIG. 9 is a diagram explaining a method of fabricating a composite sheet member in the process of manufacturing the spherical annular seal member in accordance with the present invention.
Figure 10:
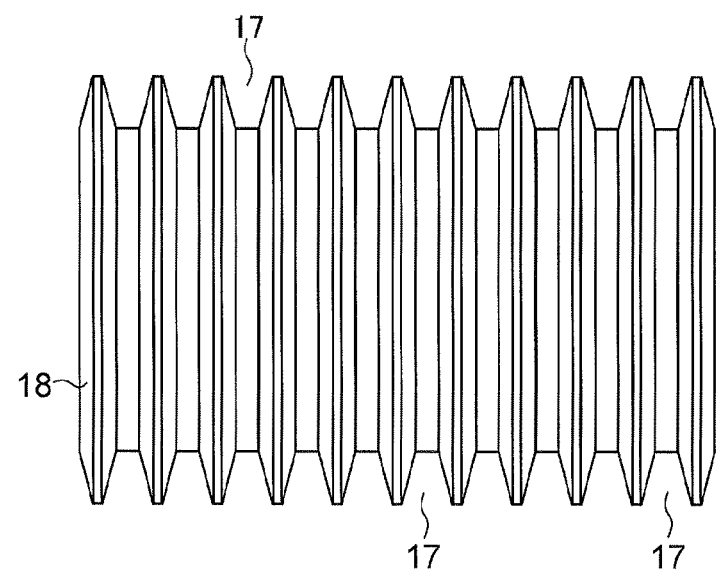
FIG. 10 is a front elevational view of a roller having a plurality of annular recessed grooves in the process of fabricating the composite sheet member shown in FIG. 9.
Figure 11:
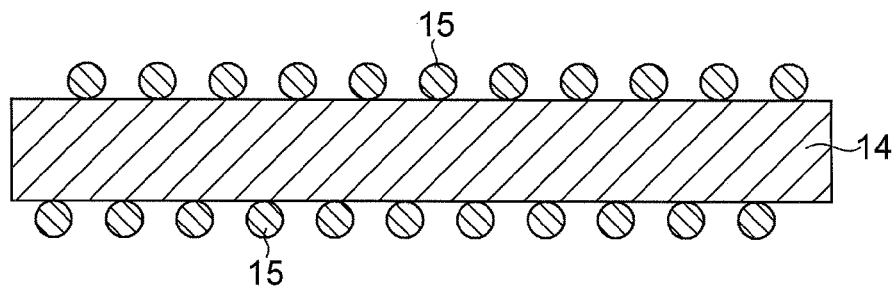
FIG. 11 is an explanatory diagram illustrating a state in which the heat-resistant material is inserted in the reinforcing member made from a cylindrical knitted metal wire net in the process of fabricating the composite sheet member shown in FIG. 9.
Figure 12:
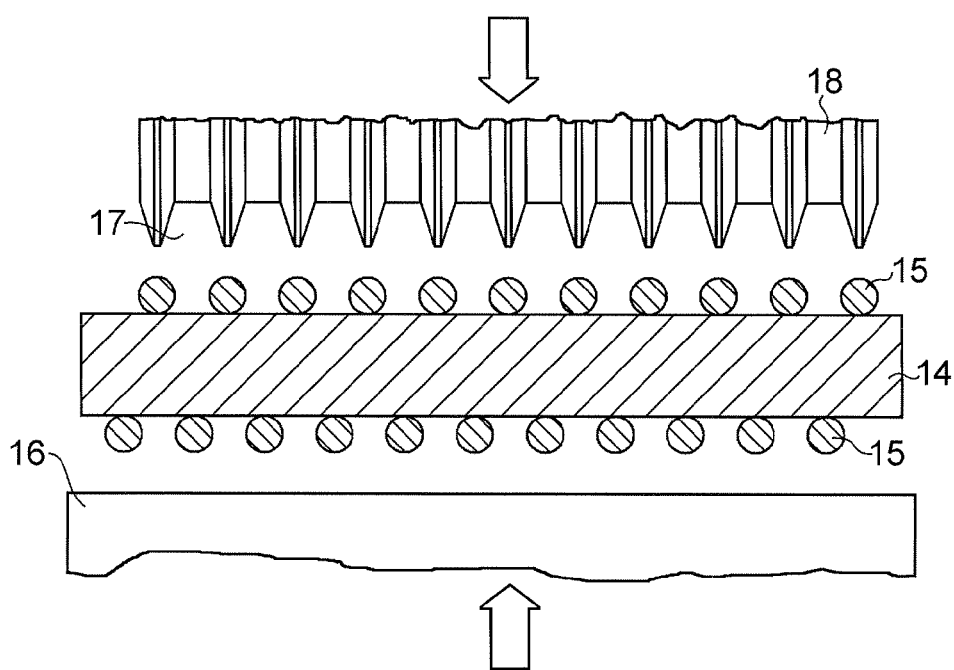
FIG. 12 is an explanatory diagram illustrating a state in which the heat-resistant material inserted in the reinforcing member is located between the roller having the plurality of annular recessed grooves and the cylindrical roller in the process of fabricating the composite sheet member shown in FIG. 9.
Figure 13:
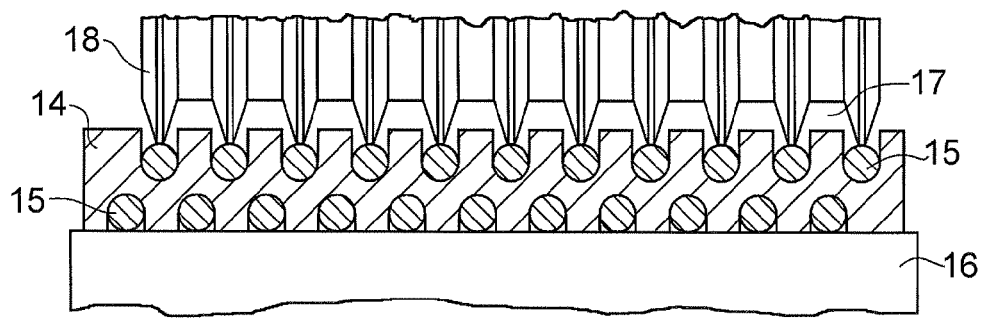
FIG. 13 is an explanatory diagram illustrating a state in which the heat-resistant material inserted in the reinforcing member is being pressurized by the roller having the plurality of annular recessed grooves and the cylindrical roller in the process of fabricating the composite sheet member shown in FIG. 9.
Figure 14:
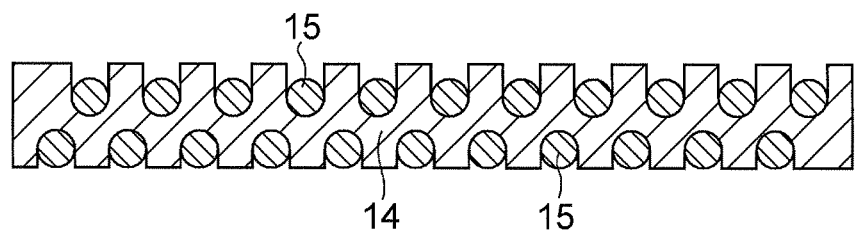
FIG. 14 is an explanatory diagram illustrating a state persisting after the heat-resistant material inserted in the reinforcing member has been pressurized by the roller having the plurality of annular recessed grooves and the cylindrical roller in the process of fabricating the composite sheet member shown in FIG. 9.
Figure 15:
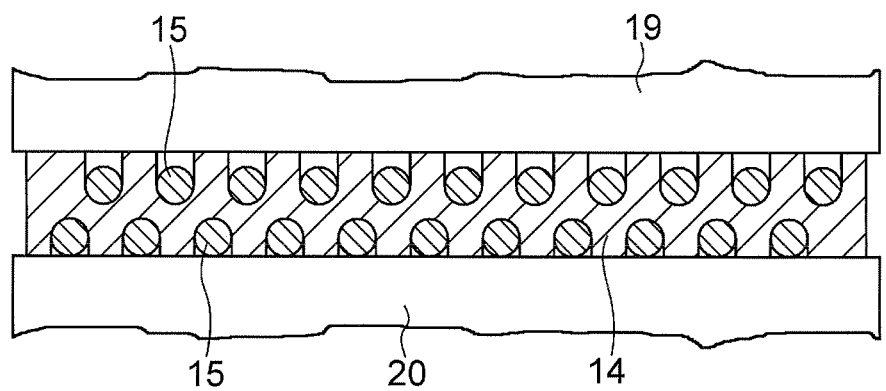
FIG. 15 is an explanatory diagram illustrating a state in which, after having been pressurized by the roller having the plurality of annular recessed grooves and the cylindrical roller, the heat-resistant material inserted in the reinforcing member is being pressurized by another pair of cylindrical rollers in the process of fabricating the composite sheet member shown in FIG. 9.
Figure 16:
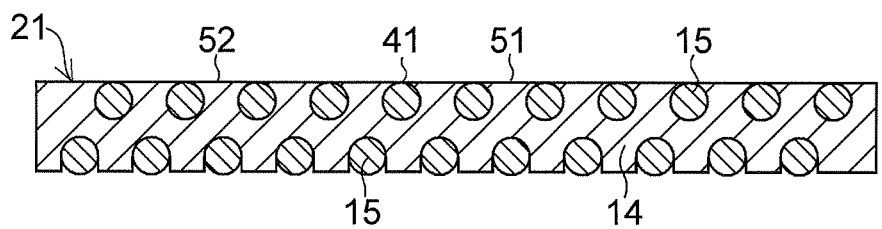
FIG. 16 is an explanatory diagram illustrating the composite sheet member fabricated after being subjected to the process of fabricating the composite sheet member shown in FIG. 9.
Figure 17:
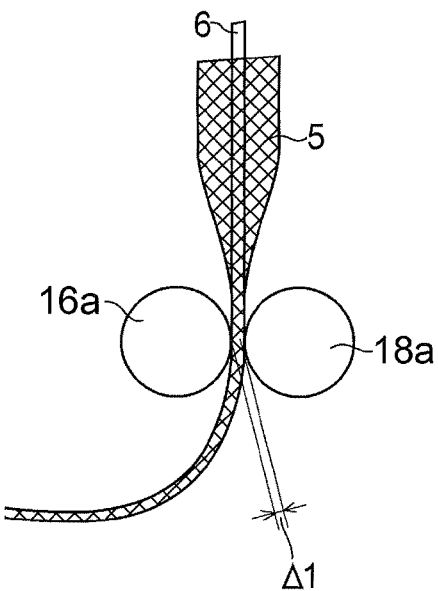
FIG. 17 is an explanatory diagram explaining another method of fabricating the composite sheet member in the process of manufacturing the spherical annular seal member in accordance with the present invention.
Figure 18:
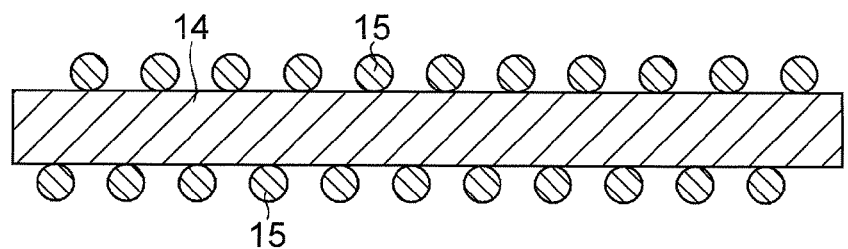
FIG. 18 is an explanatory diagram illustrating a state in which the heat-resistant material is inserted in the reinforcing member made from the cylindrical knitted metal wire net in the process of fabricating the composite sheet member shown in FIG. 17.
Figure 19:
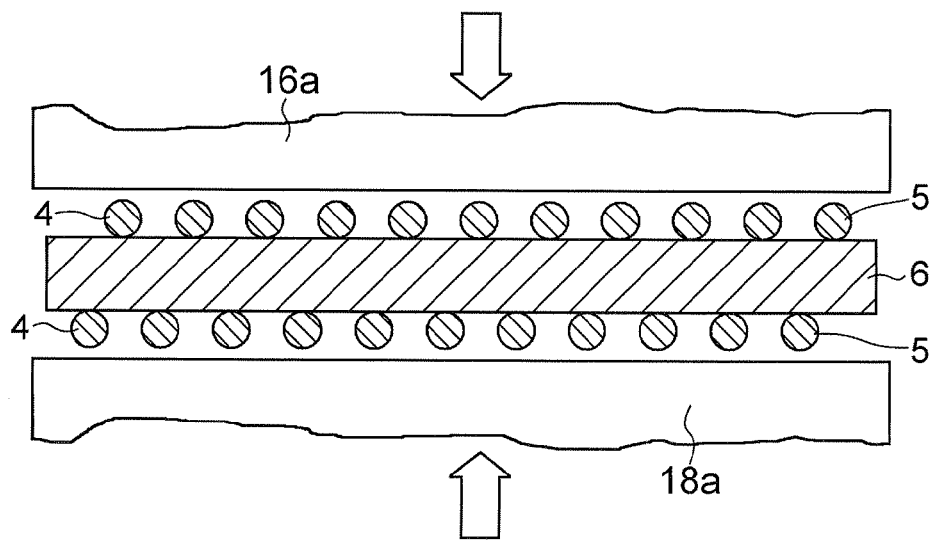
FIG. 19 is an explanatory diagram illustrating a state in which the heat-resistant material inserted in the reinforcing member is located between a pair of cylindrical rollers in the process of fabricating the composite sheet member shown in FIG. 17.
Figure 20:
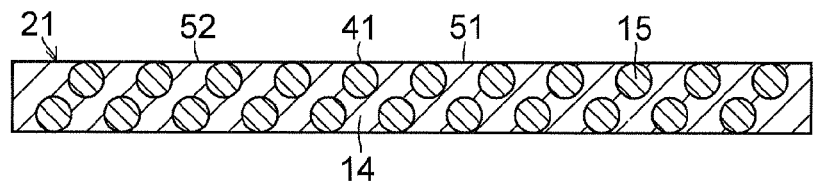
FIG. 20 is an explanatory diagram illustrating the composite sheet member fabricated after being subjected to the process of fabricating the composite sheet member shown in FIG. 17.

<First Method> The heat-resistant material 14 for the outer layer is continuously inserted into a reinforcing member 15 for the outer layer constituted by a hollow cylindrical knitted metal wire net obtained by continuously knitting a fine metal wire with a wire diameter of 0.15 to 0.32 mm, preferably 0.15 to 0.28 mm, by a knitting machine (not shown) (see FIG. 9). The reinforcing member 15 with the heat-resistant material 14 inserted therein is fed, starting with its insertion start end side, into a nip Δ1 between a cylindrical roller 16 having a smooth cylindrical outer peripheral surface and a roller 18 having a cylindrical outer peripheral surface with a plurality of annular recessed grooves 17 along the axial direction (see FIGS. 9 and 10), so as to be pressurized in the thicknesswise direction of the heat-resistant material 14 (see FIGS. 9, 11, 12, 13, and 14), and is further fed into a nip Δ2 between another pair of cylindrical rollers 19 and 20 each having a smooth cylindrical outer peripheral surface (see FIGS. 9 and 15) so as to be pressurized. Thus, a flattened composite sheet member 21 (see FIG. 16) is formed in which the heat-resistant material 14 for the outer layer and the reinforcing member 15 for the outer layer are pressure bonded to each other such that the heat-resistant material 14 for the outer layer is tightly filled in the meshes of the metal wire net of the reinforcing member 15 for the outer layer, and parts of the reinforcing member 15 for the outer layer in the heat-resistant material 14 for the outer layer are exposed to the surface of the heat-resistant material 14, while the other portions thereof are embedded therein, whereby the surface of the heat-resistant material 14 for the outer layer and the surface of the reinforcing member 15 for the outer layer are formed flush with each other, and the surface of the heat-resistant material 14 and the surface of the reinforcing member 15 are exposed. This flattened composite sheet member 21 is cut to a length of such a measure as to be capable of being wound around the outer peripheral surface of the tubular base member 13 by one turn.

The nip Δ1 between the cylindrical roller 16 and the roller 18 having the plurality of annular recessed grooves 17 on the outer peripheral surface along the axial direction is preferably set in the range of 0.35 to 0.60 mm, and the nip Δ2 between the pair of rollers 19 and 20 is preferably set in the range of 0.45 to 0.65 mm.

<Second Method> As shown in FIGS. 17 to 20, another heat-resistant material 14 for the outer layer whose density is 0.3 to 0.9 Mg/m$^3$, preferably 0.3 to 0.6 Mg/m$^3$ is separately prepared. The heat-resistant material 14 for the outer layer is continuously inserted into a reinforcing member 15 for the outer layer constituted by a hollow cylindrical knitted metal wire net obtained by continuously knitting a fine metal wire with a wire diameter of 0.15 to 0.32 mm, preferably 0.15 to 0.175 mm, by a knitting machine (not shown) (see FIG. 17). The reinforcing member 15 for the outer layer with the heat-resistant material 14 inserted therein is fed, starting with its insertion start end side, into a nip Δ1 between a pair of cylindrical rollers 16a and 18a each having a smooth cylindrical outer peripheral surface, so as to be pressurized in the thicknesswise direction of the heat-resistant material 14 (see FIGS. 18 and 19). Thus, a flattened composite sheet member 21 (see FIG. 20) is formed in which the heat-resistant material 14 for the outer layer and the reinforcing member 15 for the outer layer are pressure bonded to each other such that the heat-resistant material 14 for the outer layer is tightly filled in the meshes of the metal wire net of the reinforcing member 15 for the outer layer, and parts of the reinforcing member 15 for the outer layer in the heat-resistant material 14 for the outer layer are exposed to the surface of the heat-resistant material 14, while the other portions thereof are embedded therein, whereby the surface of the heat-resistant material 14 for the outer layer and the surface of the reinforcing member 15 for the outer layer are formed flush with each other, and the surface of the heat-resistant material 14 and the surface of the reinforcing member 15 are exposed. This flattened composite sheet member 21 is cut to a length of such a measure as to be capable of being wound around the outer peripheral surface of the tubular base member 13 by one turn.

The nip Δ1 between the above-described pair of cylindrical rollers 16a and 18a is preferably set in the range of 0.35 to 0.60 mm. It should be noted that, in this second method as well, the step may be inserted in which the reinforcing member 15 for the outer layer with the heat-resistant material 14 inserted therein is also fed into the nip Δ2 between another pair of cylindrical rollers 19 and 20 each having a smooth cylindrical outer peripheral surface in the above-described first method (see FIGS. 9 and 15) so as to be subjected to pressurization.

<Third Method (Not Shown)> In the same way as the heat-resistant material 14 for the outer layer obtained in the above-described fifth process, another heat-resistant material 14 for the outer layer is separately prepared which has a width identical to the width D of the reinforcing member 15 (belt-shaped metal wire net) for the outer layer, and whose density is 0.3 to 0.9 Mg/m$^3$, preferably 0.3 to 0.6 Mg/m$^3$. A plain woven metal wire net is prepared as a woven metal wire net which is formed by weaving a fine metal wire with a diameter of 0.15 to 0.32 mm, preferably a diameter of 0.15 to 0.175 mm. The reinforcing member 15 for the outer layer made from this plain woven metal wire net is cut to a predetermined length and width, and two of these reinforcing members 15 for the outer layer are prepared. The above-described heat-resistant material 14 for the outer layer is inserted (placed) between the two reinforcing members 15 for the outer layer, and are subjected to pressurization in the thicknesswise direction of the heat-resistant material 14 by being passed through a pair of cylindrical rollers. Thus, a flattened composite sheet member 21 is formed in which the heat-resistant material 14 for the outer layer and the reinforcing member 15 for the outer layer are pressure bonded to each other such that parts of the reinforcing member 15 for the outer layer made from the plain woven metal wire net are exposed to the surface of the heat-resistant material 14, while the other portions thereof are embedded therein, whereby the surface of the heat-resistant material 14 for the outer layer and the surface of the reinforcing member 15 for the outer layer are formed flush with each other, and the surface of the heat-resistant material 14 and the surface of the reinforcing member 15 are exposed. This flattened composite sheet member 21 is cut to a length of such a measure as to be capable of being wound around the outer peripheral surface of the tubular base member 13 by one turn.

The nip between the above-described pair of cylindrical rollers is preferably set in the range of 0.35 to 0.60 mm. It should be noted that, in this third method as well, the step may be inserted in which the reinforcing member 15 for the outer layer with the heat-resistant material 14 inserted therein is also fed into the nip Δ2 between another pair of cylindrical rollers 19 and 20 each having a smooth cylindrical outer peripheral surface in the above-described first method (see FIGS. 9 and 15) so as to be subjected to pressurization.

The surface roughness of one surface 51 of the flattened composite sheet member 21, which is obtained by one of the above-described first, second, and third methods and has a surface 52 of the heat-resistant material 14 for the outer layer and a surface 41 of the reinforcing member 15 for the outer layer exposed together with that surface 52, should preferably be 5 to 30 μm in arithmetic mean roughness Ra.

The springback of the reinforcing member 15 for the outer layer is small after being pressurized by the cylindrical roller 16 and the roller 18 having the plurality of annular recessed grooves 17 on the outer peripheral surface along the axial direction and further by the pair of cylindrical rollers 19 and 20 (the above-described first method), or by the pair of cylindrical rollers 16a and 18a each having a smooth cylindrical outer peripheral surface and, depending on cases, additionally by the pair of cylindrical rollers 19 and 20 (the above-described second method), or by the above-described third method. Meanwhile, the density of the heat-resistant material 14 for the outer layer is a low density of 0.3 to 0.9 Mg/m$^3$ (0.3 to 0.6 times the density of the heat-resistant material 6 for the spherical annular base member). Therefore, in the composite sheet member 21 obtained by the process of pressurization in the thicknesswise direction of the heat-resistant material 14, the heat-resistant material 14 for the outer layer and the reinforcing member 15 for the outer layer are pressure bonded to each other such that the heat-resistant material 14 for the outer layer is tightly filled in the meshes of the metal wire net of the reinforcing member 15 for the outer layer without any gaps, and parts of the reinforcing member 15 for the outer layer in the heat-resistant material 14 for the outer layer are exposed to the surface, while the other portions thereof are embedded in the heat-resistant material 14 for the outer layer. The surface 41 of the reinforcing member 15 is exposed together with the surface 52 of the heat-resistant material 14 on the one surface 51 of the composite sheet member 21.

In addition, the surface roughness of the composite sheet member 21 where the surface 41 of the reinforcing member 15 is exposed together with the surface 41 of the heat-resistant material 14 on the one surface 51 of the composite sheet member 21 is 5 to 30 μM in arithmetic mean roughness Ra.

It should be noted that, as for the arithmetic mean roughness Ra of the one surface 51 of the composite sheet member 21 where the surface 41 of the reinforcing member 15 is exposed, the surface roughness is measured at 60 points in the widthwise and lengthwise directions of the composite sheet member 21, and the arithmetic mean roughness Ra is shown by a mean value of these measurements.

(Seventh Process) As the molten fluororesin compositions, the following aqueous dispersions are prepared: (1) an aqueous dispersion composed of 11.5 to 45% by mass of an FEP powder, 11.5 to 45% by mass of an h-BN powder with a particle size of 0.01 to 1 μM, 0.01 to 13.5% by mass of a surfactant, and the balance of water, (2) an aqueous dispersion composed of 11.5 to 45% by mass of an FEP powder, 11.5 to 45% by mass of an h-BN powder with a particle size of 0.01 to 10.5 to 8% by mass of a graphite powder, 0.01 to 13.5% by mass of a surfactant, and the balance of water, (3) an aqueous dispersion composed of 11.5 to 45% by mass of an FEP powder, 11.5 to 45% by mass of an h-BN powder with a particle size of 0.01 to 1 μM, 0.01 to 13.5% by mass of a surfactant, 0.1 to 22.5% by mass of an aqueous organic solvent, and the balance of water, and (4) an aqueous dispersion composed of 11.5 to 45% by mass of an FEP powder, 11.5 to 45% by mass of an h-BN powder with a particle size of 0.01 to 1 μm, 0.5 to 8% by mass of a graphite powder, 0.01 to 13.5% by mass of a surfactant, 0.1 to 22.5% by mass of an aqueous organic solvent, and the balance of water.

Figure 21:
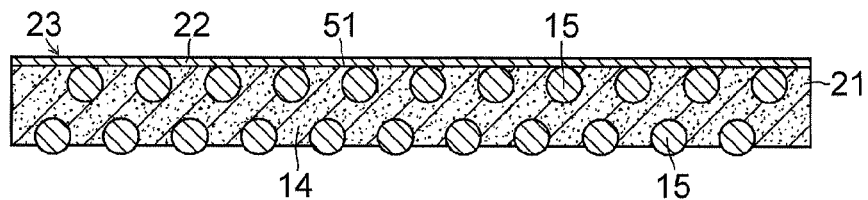
FIG. 21 is an explanatory diagram illustrating an outer-layer forming member in the process of manufacturing the spherical annular seal member in accordance with the present invention.

The aqueous dispersions in (1) to (4) above are each applied to the surface 51 of the composite sheet member 21 fabricated by one of the above-described first, second, and third methods by means of roller coating, brushing, spraying, or the like. The aqueous dispersion is dried at a temperature of 100° C. to form a coating layer of a molten fluororesin composition on the surface 51 of the composite sheet member 21, and is subsequently heated in a heating furnace at a temperature (250 to 365° C.) in a range of the melting point (T: 240° C.) of the FEP to (T+150° C.), preferably (T+5° C.) to (T+135° C.), more preferably (T+10° C.) to (T+125° C.), to thereby form an outer-layer forming member 23 (see FIG. 21) in which a heated coating layer 22 constituted by a molten fluororesin composition is formed on the one surface 51 of the composite sheet member 21.

Figure 22:
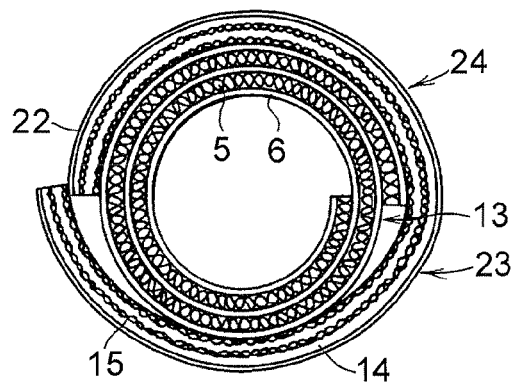
FIG. 22 is a plan view illustrating a cylindrical preform in the process of manufacturing the spherical annular seal member in accordance with the present invention.

(Eighth Process) The outer-layer forming member 23 thus obtained is wound around an outer peripheral surface of the aforementioned tubular base member 13 with its heated coating layer 22 placed on the outer side, thereby preparing a cylindrical preform 24 (see FIG. 22)

Figure 23:
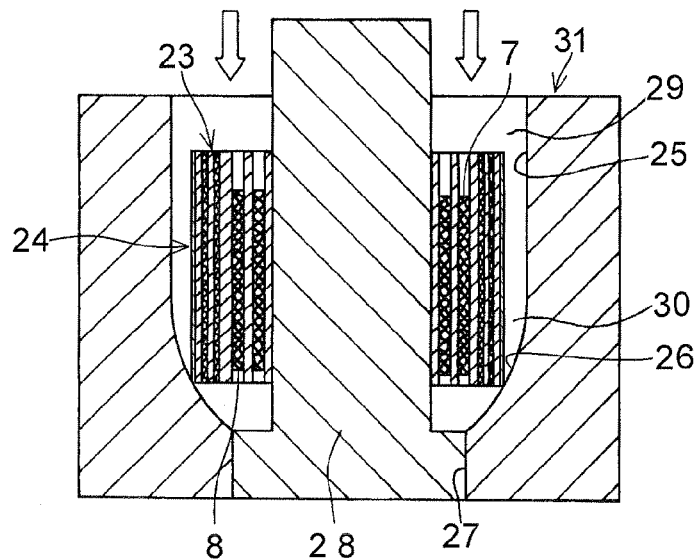
FIG. 23 is a vertical cross-sectional view illustrating a state in which the cylindrical preform is inserted in a die in the process of manufacturing the spherical annular seal member in accordance with the present invention.

(Ninth Process) A die 31, as shown in FIG. 23, is prepared which has on its inner surface a cylindrical inner wall surface 25, a partially concave spherical surface 26 continuing from the cylindrical inner wall surface 25, and a through hole 27 continuing from the partially concave spherical surface 26, and in which a hollow cylindrical portion 29 and a spherical annular hollow portion 30 continuing from the hollow cylindrical portion 29 are formed inside it as a stepped core 28 is inserted in the through hole 27. Then, the cylindrical preform 24 is fitted over the stepped core 28 of the die 31.

Figure 2:
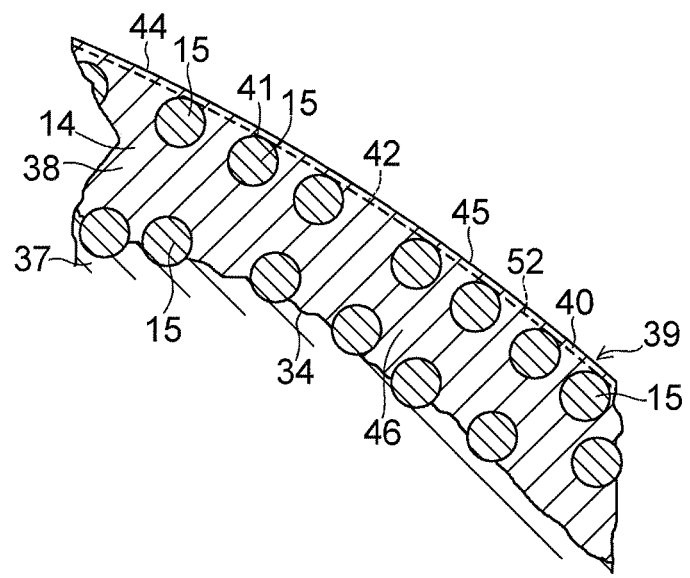
FIG. 2 is a partially enlarged explanatory diagram of the spherical annular seal member shown in FIG. 1.

The cylindrical preform 24 disposed in the hollow cylindrical portion 29 and the spherical annular hollow portion 30 of the die 31 is subjected to compression forming under a pressure of 98 to 392 N/mm$^2$ (1 to 4 tons/cm$^2$) in the direction of the core axis. Thus, the spherical annular seal member 39 is fabricated which includes a spherical annular base member 37 having a through hole 32 in its central portion and defined by a cylindrical inner surface 33, and the large- and small-diameter side annular end faces 35 and 36 of the partially convex spherical surface 34, as well as an outer layer 38 formed integrally on the partially convex spherical surface 34 of the spherical annular base member 37, as shown in FIGS. 1 and 2.

By means of this compression forming, the spherical annular base member 37 is constructed so as to be provided with structural integrity as the heat-resistant material 6 for the spherical annular base member and the reinforcing member 5 for the spherical annular base member are compressed to each other and intertwined with each other. The surface 44 of the outer layer 38 is constituted by a smooth surface 45 of a heated sliding layer 40 (corresponding to the heated coating layer 22) of the molten fluororesin composition which is integrally adhered to and formed on an outer-layer intermediate layer surface 42 (corresponding to the one surface 51 of the composite sheet member 21) constituted by the surface 52 of the heat-resistant material 14 for the outer layer and the surface 41 of the reinforcing member 15 for the outer layer which is flush with the surface 52 of the heat-resistant material 14.

In the fourth process, if the tubular base member 13 is formed by convoluting the superposed assembly 12 in a state in which the reinforcing member 5 constituted by the belt-shaped metal wire net 4 is placed on the inner side, instead of convoluting the superposed assembly 12 with the heat-resistant material 6 placed on the inner side, it is possible to fabricate the spherical annular seal member 39 is which the reinforcing member 5 constituted by the metal wire net is exposed on the cylindrical inner surface 33 of the spherical annular base member 37. In the spherical annular seal member 39 in which the reinforcing member 5 constituted by the metal wire net is exposed on this cylindrical inner surface 33, its fitting force at the time of pressure fitting onto the outer peripheral surface of an exhaust pipe becomes strong, so that the spherical annular seal member 39 is firmly secured to the outer peripheral surface of the exhaust pipe.

The fabricated spherical annular seal member 39 includes the spherical annular base member 37, which is defined by the cylindrical inner surface 33, the partially convex spherical surface 34, and the large- and small-diameter side annular end faces 35 and 36 of the partially convex spherical surface 34, and the outer layer 38 formed integrally on the partially convex spherical surface 34 of the spherical annular base member 37. The spherical annular base member 37 includes the reinforcing member 5 made from the metal wire net and the heat-resistant material 6 containing expanded graphite and compressed in such a manner as to fill meshes of the metal wire net of the reinforcing member 5 and to be integrated with the reinforcing member 5 in mixed form. The outer layer 38 is comprised of a base layer 46 which includes the reinforcing member 15 made from the metal wire net and compressed and the heat-resistant material 14 containing expanded graphite, compressed in such a manner as to fill meshes of the metal wire net of the reinforcing member 15 and to be tightly pressure bonded to the reinforcing member 15, and having the surface 52 which is flush with the surface 41 of the reinforcing member 15 and forms the outer-layer intermediate layer surface 42 together with that surface 41, the base layer 46 being formed integrally with the partial convex spherical surface 34, and of the heated sliding layer 40 of the molten fluororesin composition which is integrally adhered to and formed on the base layer 46 at that outer-layer intermediate layer surface 42.

In the spherical annular seal member 39, the outer-layer intermediate layer surface 42 of the base layer 46 formed by the reinforcing member 15 and the heat-resistant material 14 in the outer layer 38 is dotted with that reinforcing member 15, the surface roughness of the outer-layer intermediate layer surface 42 is formed to be 5 to 30 μm in the arithmetic mean roughness Ra, and the surface 44 of the outer layer 38 exposed to the outside is constituted by the smooth surface 45 of the heated sliding layer 40.

Figure 24:
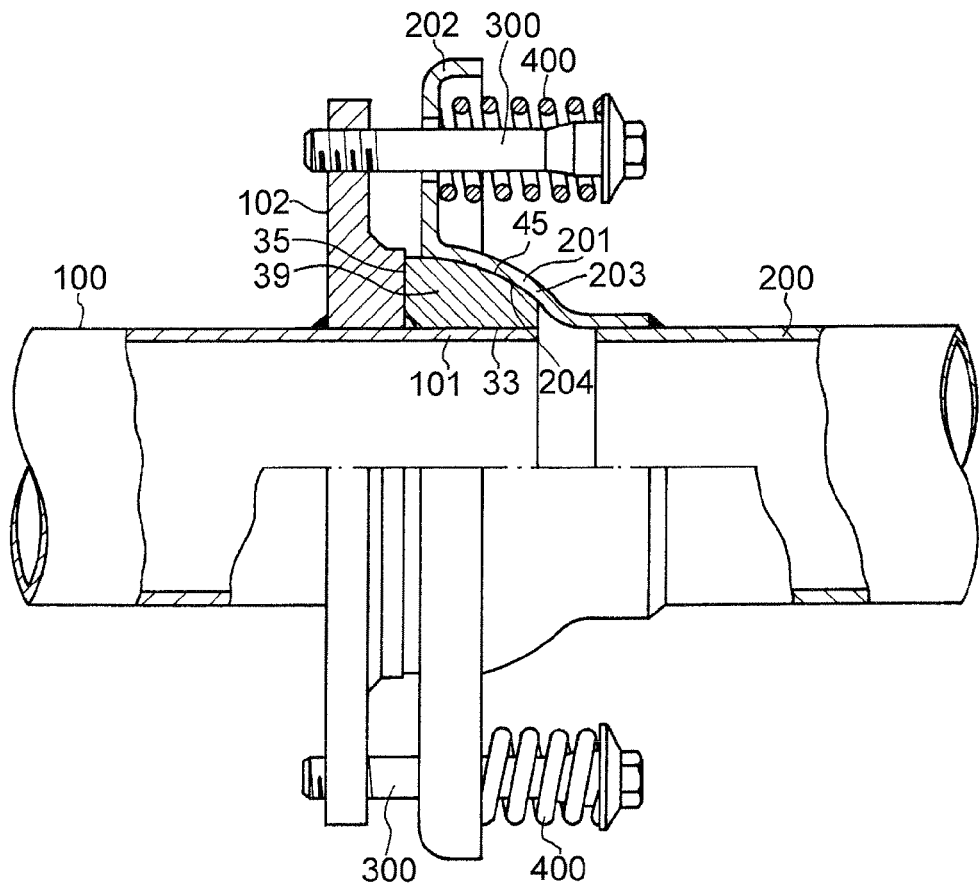
FIG. 24 is a vertical cross-sectional view illustrating an exhaust pipe joint incorporating the spherical annular seal member in accordance with the present invention.
Figure 25:
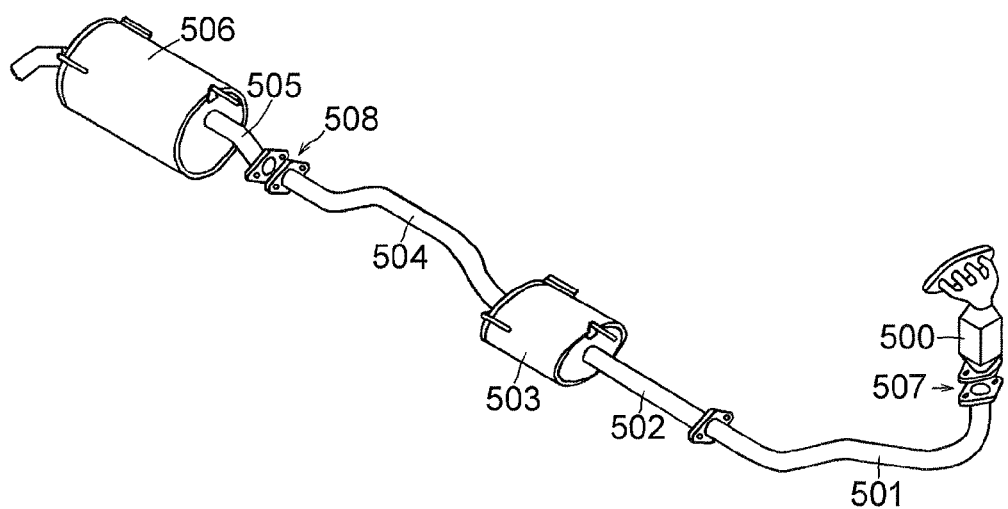
FIG. 25 is an explanatory diagram illustrating an exhaust system of an automobile engine.

The spherical annular seal member 39 is used by being incorporated in the exhaust pipe spherical joint shown in FIG. 24. That is, in the exhaust pipe spherical joint shown in FIG. 24, a flange 102 is provided uprightly on an outer peripheral surface of an upstream-side exhaust pipe 100, which is connected to an engine side, by leaving a pipe end 101. The spherical annular seal member 39 is fitted and fixed over the pipe end 101 at the cylindrical inner surface 33 defining the through hole 32, and is seated with its large-diameter side annular end face 35 abutting against that flange 102. A flared portion 203, which integrally has a concave spherical surface portion 201 and a flange portion 202 continuous from the concave spherical surface portion 201, is secured to a downstream-side exhaust pipe 200 disposed in such a manner as to oppose the upstream-side exhaust pipe 100 and is connected to the muffler side. An inner surface 204 of the concave spherical surface portion 201 is in sliding contact with the smooth surface 45 of the heated sliding layer 40 in the outer layer 38 of the spherical annular seal member 39.

In the exhaust pipe spherical joint shown in FIG. 24, the downstream-side exhaust pipe 200 is constantly urged resiliently toward the upstream-side exhaust pipe 100 by means of a pair of bolts 300 each having one end fixed to the flange 102 and another end arranged by being inserted in the flange portion 202 of the flared portion 203, and by means of a pair of coil springs 400 each arranged between an enlarged head portion of the bolt 300 and the flange portion 202. Further, the exhaust pipe spherical joint is arranged such that relative angular displacements occurring in the upstream- and downstream-side exhaust pipes 100 and 200 are allowed by sliding contact between the smooth surface 45 serving as a sliding surface of the outer layer 38 of the spherical annular seal member 39 and the inner surface 204 of the concave spherical surface portion 201 of the flared portion 203 formed at the end of the downstream-side exhaust pipe 200.

EXAMPLES

Next, the present invention will be described in detail in accordance with examples. It should be noted that the present invention is not limited to these examples.

Examples 1 to 3

By using one austenitic stainless steel wire (SUS 304) having a wire diameter of 0.28 mm as a fine metal wire, a cylindrical knitted metal wire net whose mesh size was 4 mm long and 5 mm wide was fabricated and was passed between a pair of rollers to form a belt-shaped metal wire net. This metal wire net was used as the reinforcing member for the spherical annular base member. As the heat-resistant material for the spherical annular base member, an expanded graphite sheet having a density of 1.12 $Mg/m^3$ and a thickness of 0.38 mm was used. After the heat-resistant material for the spherical annular base member was convoluted by a one-circumference portion, the reinforcing member for the spherical annular base member was superposed on the inner side of the heat-resistant material for the spherical annular base member, and the superposed assembly thereof was convoluted, thereby preparing a tubular base member in which the heat-resistant material for the spherical annular base member was located on the outermost periphery. In this tubular base member, widthwise opposite end portions of the heat-resistant material for the spherical annular base member respectively projected from the reinforcing member for the spherical annular base member in the widthwise direction.

As the heat-resistant material for the outer layer, an expanded graphite sheet having a density of 0.5 $Mg/m^3$ and a thickness of 1.35 mm was used. As the reinforcing member for the outer layer, a cylindrical knitted metal wire net was continuously knitted by using an austenitic stainless steel wire (SUS 304) having a wire diameter of 0.15 mm, and the heat-resistant material for the outer layer was continuously inserted into the inner surface of the cylindrical knitted metal wire net. The reinforcing member for the outer layer with the heat-resistant material inserted therein was fed, starting with the insertion start end side of the heat-resistant material, into the nip (the nip Δ1 was set to 0.50 mm) between a cylindrical roller and a roller having on its outer peripheral surface the plurality of annular recessed grooves along the axial direction, so as to be pressurized in the thicknesswise direction of the heat-resistant material, and was further fed into the nip (the nip Δ2 was set to 0.45 mm) between another pair of cylindrical rollers so as to be pressurized. Thus, a flattened composite sheet member was formed in which the heat-resistant material for the outer layer and the reinforcing member for the outer layer were pressure bonded to each other such that the heat-resistant material for the outer layer was tightly filled in the meshes of the metal wire net of the reinforcing member for the outer layer, and the reinforcing member for the outer layer was embedded in the heat-resistant material for the outer layer, whereby the surface of the heat-resistant material for the outer layer and the surface of the reinforcing member for the outer layer were formed flush with each other, and the surface of that reinforcing member and the surface of the heat-resistant material for the outer layer were exposed in a dotted manner. In this flattened composite sheet member, the surface of the reinforcing member, together with the surface of the heat-resistant material, was exposed on one surface of the composite sheet member in a dotted manner, and the arithmetic mean roughness Ra of that surface was 8.28 μm.

An aqueous dispersion was prepared which was composed of 12.5 to 37.5% by mass of an FEP powder with an average particle size of 0.2 μM, 12.5 to 37.5% by mass of an h-BN powder with an average particle size of 1 μm, 5% by mass of polyoxyenthelene alkyl ether (nonionic surfactant) as a surfactant, and 45% by mass of water.

The above-described aqueous dispersion was roller coated on the one surface of the composite sheet member where the surface of the reinforcing member, together with the surface of the heat-resistant material, was exposed in a dotted manner, and the composite sheet member having a coating layer of the molten fluororesin composition which was adhered and formed by the roller coating of this aqueous dispersion was dried, and was then subjected to heating in a heating furnace at a temperature of 340° C. for 20 minutes, thereby fabricating an outer-layer forming member having on the surface of the composite sheet member a heated coating layer constituted by the molten fluororesin composition (25 to 75% by mass of FEP and 25 to 75% by mass of h-BN).

The aforementioned outer-layer forming member with its heated coating layer placed on the outer side was wound around the outer peripheral surface of the aforementioned tubular base member, thereby preparing a cylindrical preform. This cylindrical preform was fitted over the stepped core of the die shown in FIG. 23, and was positioned in the hollow portion of the die.

The cylindrical preform disposed in the hollow portion of the die was subjected to compression molding at a pressure of 294 N/mm$^2$ (3 tons/cm$^2$) in the direction of the core axis, thereby obtaining a spherical annular seal member which included the spherical annular base member having the through hole in its central portion and defined by the cylindrical inner surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer was formed into a smooth surface of the heated sliding layer constituted by the heated coating layer (27 to 73% by mass of FEP and 25 to 75% by mass of h-BN) of the molten fluororesin composition which was integrally adhered to and formed on the base layer at the outer-layer intermediate layer surface constituted by the surface of the heat-resistant material for the outer layer and the surface of the reinforcing member for the outer layer which was flush with the surface of that heat-resistant material.

Example 4

By using constituent materials similar to those of the above-described Example 1, the tubular base member was fabricated in the same way as in Example 1. In this tubular base member, widthwise opposite end portions of the heat-resistant material respectively projected from the reinforcing member in the widthwise direction.

As the heat-resistant material for the outer layer, an expanded graphite sheet having a density of 0.5 Mg/m$^3$ and a thickness of 1.35 mm was used. As the reinforcing member for the outer layer, a cylindrical knitted metal wire net was continuously knitted by using an austenitic stainless steel wire (SUS 304) having a wire diameter of 0.28 mm, and the heat-resistant material for the outer layer was continuously inserted into the cylindrical knitted metal wire net. The reinforcing member with the heat-resistant material inserted therein was fed, starting with the insertion start end side of the heat-resistant material, into the nip (the nip Δ1 was set to 0.50 mm) between the cylindrical roller and the roller having on its outer peripheral surface the plurality of annular recessed grooves along the axial direction, so as to be pressurized in the thicknesswise direction of the heat-resistant material, and was further fed into the nip (the nip Δ2 was set to 0.45 mm) between another pair of cylindrical rollers so as to be pressurized. Thus, a flattened composite sheet member was formed in which the heat-resistant material for the outer layer and the reinforcing member for the outer layer were pressure bonded to each other such that the heat-resistant material for the outer layer was tightly filled in the meshes of the metal wire net of the reinforcing member for the outer layer, and the reinforcing member for the outer layer was embedded in the heat-resistant material for the outer layer, whereby the surface of the heat-resistant material for the outer layer and the surface of the reinforcing member for the outer layer were formed flush with each other, and the surface of that reinforcing member and the surface of the heat-resistant material for the outer layer were exposed in a dotted manner. In this flattened composite sheet member, the surface of the reinforcing member, together with the surface of the heat-resistant material, was exposed on one surface of the composite sheet member in a dotted manner, and the arithmetic mean roughness Ra of that surface was 19.3 μm.

An aqueous dispersion was prepared which was composed of 27.5% by mass of the FEP powder with an average particle size of 0.2 μm, 22.5% by mass of the h-BN powder with an average particle size of 1 μm, 5% by mass of polyoxyenthelene alkyl ether (nonionic surfactant) as a surfactant, and 45% by mass of water.

The above-described aqueous dispersion was roller coated on the one surface of the composite sheet member where the surface of the reinforcing member, together with the surface of the heat-resistant material, was exposed in a dotted manner, and the composite sheet member having a coating layer of the molten fluororesin composition which was adhered and formed by the roller coating of this aqueous dispersion was dried, and was then subjected to heating in the heating furnace at a temperature of 340° C. for 20 minutes, thereby fabricating an outer-layer forming member having on the surface of the composite sheet member the heated coating layer constituted by the molten fluororesin composition (55% by mass of FEP and 45% by mass of h-BN).

The aforementioned outer-layer forming member with its heated coating layer placed on the outer side was wound around the outer peripheral surface of the aforementioned tubular base member, thereby preparing a cylindrical preform. Thereafter, by compression molding similar to that of the above-described Example 1, a spherical annular seal member was obtained which included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer was formed into a smooth surface of the heated sliding layer constituted by the heated coating layer (55% by mass of FEP and 45% by mass of h-BN) of the molten fluororesin composition which was integrally adhered to and formed on the base layer at the outer-layer intermediate layer surface constituted by the surface of the heat-resistant material for the outer layer and the surface of the reinforcing member for the outer layer which was flush with the surface of that heat-resistant material.

Examples 5 to 7

By using constituent materials similar to those of the above-described Example 1, the tubular base member was fabricated in the same way as in Example 1. In this tubular base member, widthwise opposite end portions of the heat-resistant material respectively projected from the reinforcing member in the widthwise direction.

A flattened composite sheet member was prepared by a method similar to that of the above-described Example 1 by using as the heat-resistant material for the outer layer an expanded graphite sheet similar to that of the above-described Example 1 and using as the reinforcing member for the outer layer a reinforcing member similar to that of the above-described Example 1. In this flattened composite sheet, the surface of the reinforcing member, together with the surface of the heat-resistant material, was exposed on one surface of the composite sheet member in a dotted manner, and the arithmetic mean roughness Ra of that surface was 8.32 μm.

An aqueous dispersion was prepared which was composed of 11.5 to 36.5% by mass of the FEP powder with an average particle size of 0.2 μM, 11.5 to 36.5% by mass of the h-BN powder with an average particle size of 1 μm, 2.0 to 4.5% by mass of natural graphite powder (hereafter abbreviated as "Gr") which passed a 400-mesh sieve, 5% by mass of polyoxyenthelene alkyl ether (nonionic surfactant) as a surfactant, and 45% by mass of water.

The above-described aqueous dispersion was roller coated on the one surface of the composite sheet member where the surface of the reinforcing member, together with the surface of the heat-resistant material, was exposed in a dotted manner, and the composite sheet member having a coating layer of the molten fluororesin composition which was adhered and formed by the roller coating of this aqueous dispersion was dried, and was then subjected to heating in the heating furnace at a temperature of 340° C. for 20 minutes, thereby fabricating an outer-layer forming member having formed on the surface of the composite sheet member the heated coating layer constituted by the molten fluororesin composition (23 to 73% by mass of FEP, 23 to 73% by mass of h-BN, and 4.0 to 9.0% by mass of Gr).

The aforementioned outer-layer forming member with its heated coating layer placed on the outer side was wound around the outer peripheral surface of the aforementioned tubular base member, thereby preparing a cylindrical preform. Thereafter, by compression molding similar to that of the above-described Example 1, a spherical annular seal member was obtained which included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer was formed into a smooth surface of the heated sliding layer constituted by the heated coating layer (23 to 73% by mass of FEP, 23 to 73% by mass of h-BN, and 4.0 to 9.0% by mass of Gr) of the molten fluororesin composition which was integrally adhered to and formed on the base layer at the outer-layer intermediate layer surface constituted by the surface of the heat-resistant material for the outer layer and the surface of the reinforcing member for the outer layer which was flush with the surface of that heat-resistant material.

Example 8

By using constituent materials similar to those of the above-described Example 1, the tubular base member was fabricated in the same way as in Example 1. In this tubular base member, widthwise opposite end portions of the heat-resistant material respectively projected from the reinforcing member in the widthwise direction.

A flattened composite sheet member was prepared by a method similar to that of the above-described Example 1 by using as the heat-resistant material for the outer layer an expanded graphite sheet similar to that of the above-described Example 1 and using as the reinforcing member for the outer layer a reinforcing member similar to that of the above-described Example 1. In this flattened composite sheet, the surface of the reinforcing member, together with the surface of the heat-resistant material, was exposed on one surface of the composite sheet member in a dotted manner, and the arithmetic mean roughness Ra of that surface was 8.34 μm.

An aqueous dispersion was prepared which was composed of 27.5% by mass of the FEP powder with an average particle size of 0.2 μM, 22.5% by mass of the h-BN powder with an average particle size of 1 μm, 5% by mass of polyoxyenthelene alkyl ether (nonionic surfactant), 5% by mass of ethylene glycol as an aqueous organic solvent, and 40% by mass of water.

The above-described aqueous dispersion was roller coated on the one surface of the composite sheet member where the surface of the reinforcing member, together with the surface of the heat-resistant material, was exposed in a dotted manner, and the composite sheet member having a coating layer of the molten fluororesin composition which was adhered and formed by the roller coating of this aqueous dispersion was dried, and was then subjected to heating in the heating furnace at a temperature of 340° C. for 20 minutes, thereby fabricating an outer-layer forming member having formed on the surface of the composite sheet member the heated coating layer constituted by the molten fluororesin composition (55% by mass of FEP and 45% by mass of h-BN).

The aforementioned outer-layer forming member with its heated coating layer placed on the outer side was wound around the outer peripheral surface of the aforementioned tubular base member, thereby preparing a cylindrical preform. Thereafter, by compression molding similar to that of the above-described Example 1, a spherical annular seal member was obtained which included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer was formed into a smooth surface of the heated sliding layer constituted by the heated coating layer (55% by mass of FEP and 45% by mass of h-BN) of the molten fluororesin composition which was integrally adhered to and formed on the base layer at the outer-layer intermediate layer surface constituted by the surface of the heat-resistant material for the outer layer and the surface of the reinforcing member for the outer layer which was flush with the surface of that heat-resistant material.

Example 9

By using constituent materials similar to those of the above-described Example 1, the tubular base member was fabricated in the same way as in Example 1. In this tubular base member, widthwise opposite end portions of the heat-resistant material respectively projected from the reinforcing member in the widthwise direction.

A flattened composite sheet member was prepared by a method similar to that of the above-described Example 1 by using as the heat-resistant material for the outer layer an expanded graphite sheet similar to that of the above-described Example 1 and using as the reinforcing member for the outer layer a reinforcing member similar to that of the above-described Example 1. In this flattened composite sheet member, the surface of the reinforcing member, together with the surface of the heat-resistant material, was exposed on one surface of the composite sheet member in a dotted manner, and the arithmetic mean roughness Ra of that surface was 8.40 μm.

An aqueous dispersion was prepared which was composed of 25% by mass of the FEP powder with an average particle size of 0.2 μm, 20.5% by mass of the h-BN powder with an average particle size of 1 μm, 4.5% by mass of a Gr powder which passed a 400-mesh sieve, 5% by mass of polyoxyenthelene alkyl ether (nonionic surfactant) as a surfactant, 5% by mass of ethylene glycol as an aqueous organic solvent, and 40% by mass of water.

The above-described aqueous dispersion was roller coated on the one surface of the composite sheet member where the surface of the reinforcing member, together with the surface of the heat-resistant material, was exposed in a dotted manner, and the composite sheet member having a coating layer of the molten fluororesin composition which was adhered and formed by the roller coating of this aqueous dispersion was dried, and was then subjected to heating in the heating furnace at a temperature of 340° C. for 20 minutes, thereby fabricating an outer-layer forming member having formed on the surface of the composite sheet member the heated coating layer constituted by the molten fluororesin composition (50% by mass of FEP, 41% by mass of h-BN, and 9% by mass of Gr).

The aforementioned outer-layer forming member with its heated coating layer placed on the outer side was wound around the outer peripheral surface of the aforementioned tubular base member, thereby preparing a cylindrical preform. Thereafter, by compression molding similar to that of the above-described Example 1, a spherical annular seal member was obtained which included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The surface of the outer layer was formed into a smooth surface of the heated sliding layer constituted by the heated coating layer (50% by mass of FEP, 41% by mass of h-BN, and 9% by mass of Gr) of the molten fluororesin composition which was integrally adhered to and formed on the base layer at the outer-layer intermediate layer surface constituted by the surface of the heat-resistant material for the outer layer and the surface of the reinforcing member for the outer layer which was flush with the surface of that heat-resistant material.

Comparative Example 1

By using one austenitic stainless steel wire (SUS 304) having a wire diameter of 0.28 mm as a fine metal wire, a cylindrical knitted metal wire net whose mesh size was 4 mm long and 5 mm wide was fabricated and was passed between a pair of rollers to form a belt-shaped metal wire net. This metal wire net was used as the reinforcing member for the spherical annular base member. As the heat-resistant material for the spherical annular base member, an expanded graphite sheet having a density of 1.12 Mg/m$^3$ and a thickness of 0.38 mm was used. After the heat-resistant material for the spherical annular base member was convoluted by a one-circumference portion, the reinforcing member for the spherical annular base member was superposed on the inner side of the heat-resistant material for the spherical annular base member, and the superposed assembly thereof was convoluted, thereby preparing a tubular base member in which the heat-resistant material for the spherical annular base member was located on the outermost periphery. In this tubular base member, widthwise opposite end portions of the heat-resistant material for the spherical annular base member respectively projected from the reinforcing member for the spherical annular base member in the widthwise direction.

By using one fine metal wire (austenitic stainless steel wire (SUS 304) with a wire diameter of 0.15 mm) similar to the above-described fine metal wire, a cylindrical knitted metal wire net whose mesh size was 3.5 mm long and 2.5 mm wide was fabricated and was passed between a pair of rollers to form a belt-shaped metal wire net. This metal wire net was used as the reinforcing member for the outer layer. A heat-resistant material similar to the above-described one was prepared as the heat-resistant material, and this heat-resistant material was inserted into the metal wire net. A heat-resistant material similar to the one described above was separately prepared, and a PTFE aqueous dispersion (60% by mass of PTFE, 5% by mass of a surfactant, and 35% by mass of water) was roller coated on one surface of that heat-resistant material, and was dried, thereby forming a heat-resistant material having a coating layer of PTFE.

The heat-resistant material having the coating layer of PTFE was superposed on the belt-shaped metal wire net holding the heat-resistant material in its interior with that coating layer facing upward, and an assembly thereof was passed between a pair of rollers to thereby form an integrated outer-layer forming member.

The above-described outer-layer forming member with its coating layer placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The outer layer included the compressed heat-resistant material, the reinforcing member made from the metal wire net and integrated with this heat-resistant material in mixed form, and the coating layer of PTFE integrated with the reinforcing member and the heat-resistant material, and the outer surface of the outer layer exposed to the outside was formed into a smooth surface of the coating layer of PTFE.

Comparative Example 2

A tubular base member was fabricated by materials and a method similar to those of the above-described Comparative Example 1. In the same way as the above-described Comparative Example 1, a belt-shaped metal wire net with a heat-resistant material inserted and held in its interior was fabricated, and this was used as the reinforcing member for the outer layer. A heat-resistant material similar to the one described above was separately prepared, and a PTFE aqueous dispersion (60% by mass of PTFE, 5% by mass of a surfactant, and 35% by mass of water) was roller coated on one surface of that heat-resistant material, and was dried, thereby forming a heat-resistant material having a coating layer of PTFE. Subsequently, this heat-resistant material was heated in a heating furnace for 20 minutes at a temperature of 340° C. above the melting point (327° C.) of PTFE, to thereby form a heated coating layer of PTFE on the one surface of the heat-resistant material.

The heat-resistant material having the heated coating layer of PTFE was superposed on the belt-shaped metal wire net having the heat-resistant material inserted and held in its interior with that coating layer facing upward, and an assembly thereof was passed between a pair of rollers to thereby form an integrated outer-layer forming member.

The above-described outer-layer forming member with its coating layer placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The outer layer included the compressed heat-resistant material, the reinforcing member made from the metal wire net and integrated with this heat-resistant material in mixed form, and the heated coating layer of PTFE integrated with the reinforcing member and the heat-resistant material, and the outer surface of the outer layer exposed to the outside was formed into a smooth surface of the heated coating layer of PTFE.

Comparative Example 3

A tubular base member was fabricated by materials and a method similar to those of the above-described Comparative Example 1. In the same way as the above-described Comparative Example 1, a belt-shaped metal wire net with a heat-resistant material inserted and held in its interior was fabricated, and this was used as the reinforcing member for the outer layer.

A heat-resistant material similar to that of the above-described Comparative Example 1 was separately prepared, and an aqueous dispersion (20% by mass of h-BN, 30% by mass of PTFE, 5% by mass of a surfactant, and 45% by mass of water) dispersedly containing as a solid content 50% by mass of a lubricating composition (40% by mass of h-BN and 60% by mass of PTFE) which dispersedly contained 150 parts by mass of a PTFE powder with respect to 100 parts by mass of an h-BN powder with an average particle size of 1 μm was roller coated on one surface of that heat-resistant material, and was dried at a temperature of 100° C., thereby forming a heat-resistant material having a coating layer (20% by mass of h-BN and 30% by mass of PTFE) of the lubricating composition on one surface of that heat-resistant material.

The heat-resistant material having the coating layer of the lubricating composition was superposed on the belt-shaped metal wire net having the heat-resistant material inserted and held in its interior with that coating layer facing upward, and an assembly thereof was passed between a pair of rollers to thereby form an integrated outer-layer forming member.

The above-described outer-layer forming member with the coating layer of the lubricating composition placed on the outer side was wound around the outer peripheral surface of the above-described tubular base member, thereby preparing a cylindrical preform. Thereafter, by using a die similar to that of the above-described Examples, a spherical annular seal member was obtained by a similar method, and the spherical annular seal member included the spherical annular base member having the through hole in its central portion and defined by the cylindrical inner surface, the partially convex spherical surface, and the large- and small-diameter side annular end faces of the partially convex spherical surface, as well as the outer layer formed integrally on the partially convex spherical surface of the spherical annular base member.

By means of this compression forming, the spherical annular base member was constructed so as to be provided with structural integrity as the heat-resistant material for the spherical annular base member and the reinforcing member for the spherical annular base member made from the metal wire net were compressed and intertwined with each other. The spherical annular base member included the reinforcing member for the spherical annular base member made from the compressed metal wire net and the heat-resistant material for the spherical annular base member made from expanded graphite filling meshes of this reinforcing member and compressed in such a manner as to be formed integrally with the reinforcing member in mixed form. The outer layer included the compressed heat-resistant material, the reinforcing member made from the metal wire net and integrated with this heat-resistant material in mixed form, and the coating layer of the lubricating composition integrated with the reinforcing member and the heat-resistant material, and the outer surface of the outer layer exposed to the outside was formed into a smooth surface of the coating layer (40% by mass of h-BN and 60% by mass of PTFE)

A description will be given of the results of tests conducted on the presence or absence of generation of abnormal frictional noise and the amount of gas leakage (l/min) by incorporating the spherical annular seal members obtained in Examples 1 to 9 and Comparative Examples 1 to 3 described above into the exhaust pipe spherical joint shown in FIG. 24.

<Test Conditions on Presence or Absence of Generation of Abnormal Frictional Noise and Test Method>
<Test Conditions>
   Pressing force using coil springs (spring set load: surface pressure): 3.2 N/mm$^2$
   Excitation amplitude: ±0.12 mm
   Excitation frequency: 22 Hz
   Temperature (outer surface temperature of the concave spherical surface portion 201 shown in FIG. 24): from room temperature (25° C.) to 500° C.
   Mating member (material of the flared portion 203 shown in FIG. 24): SUS 304
<Test Method>

A 40-minute temperature history is set as one cycle in which vibration is started from room temperature (25° C.) at an excitation frequency of 22 Hz and an excitation amplitude of ±0.12 mm, and at a point of time when the temperature of the mating member surface (temperature of the outer surface of the concave spherical surface portion 201 shown in FIG. 24) reaches 500° C. in 10 minutes after excitation, the test piece is held at that temperature for 10 minutes, and the temperature of the test piece is then allowed to drop to room temperature in 20 minutes. The test is repeated for 9 cycles, and abnormal frictional noise during the temperature drop is measured. Measurement cycles are 1 cycle, 3 cycles, 6 cycles, and 9 cycles, and measurement temperatures of the respective cycles are set to 500° C., 400° C., 300° C., 200° C., and 100° C.

<Determination Levels of Abnormal Frictional Noise>
   Code 0: No abnormal frictional noise is generated.
   Code 0.2: The generation of abnormal frictional noise can be confirmed by a sound collection pipe.
   Code 1: The generation of abnormal frictional noise can be confirmed at a position approx. 0.2 m away from the sliding portion of the exhaust pipe spherical joint.
   Code 1.5: The generation of abnormal frictional noise can be confirmed at a position approx. 0.5 m away from the sliding portion of the exhaust pipe spherical joint.
   Code 2: The generation of abnormal frictional noise can be confirmed at a position approx. 1 m away from the sliding portion of the exhaust pipe spherical joint.
   Code 2.5: The generation of abnormal frictional noise can be confirmed at a position approx. 2 m away from the sliding portion of the exhaust pipe spherical joint.
   Code 3: The generation of abnormal frictional noise can be confirmed at a position approx. 3 m away from the sliding portion of the exhaust pipe spherical joint.
   Code 3.5: The generation of abnormal frictional noise can be confirmed at a position approx. 5 m away from the sliding portion of the exhaust pipe spherical joint.
   Code 4: The generation of abnormal frictional noise can be confirmed at a position approx. 10 m away from the sliding portion of the exhaust pipe spherical joint.
   Code 4.5: The generation of abnormal frictional noise can be confirmed at a position approx. 15 m away from the sliding portion of the exhaust pipe spherical joint.
   Code 5: The generation of abnormal frictional noise can be confirmed at a position approx. 20 m away from the sliding portion of the exhaust pipe spherical joint.

In the overall assessment of the above-described determination levels, with respect to Codes 0 to 2.5 a determination was made that no abnormal frictional noise was generated (OK), whereas with respect to Codes 3 to 5 a determination was made that abnormal frictional noise was generated (NG).

<Test Conditions of Gas Leakage Amount and Test Method>
<Test Conditions>

Pressing force using coil springs (spring set force): 980 N
Excitation angle: ±2.5°
Excitation frequency (oscillation velocity): 5 Hz
Temperature (outer surface temperature of the concave spherical surface portion 201 shown in FIG. 24): from room temperature (25° C.) to 500° C.
Number of oscillating motions: 1,000,000
Mating member (material of the flared portion 203 shown in FIG. 24): SUS 304

<Test Method>

The temperature was raised up to 500° C. while continuing the oscillating motion at ±2.5° at an excitation frequency of 5 Hz at room temperature (25° C.). In a state in which that temperature is held, the oscillating motion was continued, and the amount of gas leakage was measured at the point of time when the number of oscillating motions reached 1,000,000.

<Measurement Method of Gas Leakage Amount>

An opening portion of the one upstream-side exhaust pipe 100 of the exhaust pipe spherical joint shown in FIG. 24 was closed, and dry air was allowed to flow into the joint portion from the other downstream-side exhaust pipe 200 side under a pressure of 0.049 MPa (0.5 kgf/cm$^2$). The amount of leakage from the joint portion (sliding contact portions between the surface 45 of the spherical annular seal member 39 and the flared portion 203, fitting portions between the cylindrical inner surface 33 of the spherical annular seal member 39 and the pipe end portion 101 of the upstream-side exhaust pipe 100, and abutting portions between the annular end face 35 and the flange 102 provided uprightly on the upstream-side exhaust pipe 100) was measured by means of a flowmeter 4 times, i.e., (1) at an early period of test (before testing start), (2) after 250,000 oscillating motions, (3) after 500,000 oscillating motions, and (4) after 1,000,000 oscillating motions.

Tables 1 to 4 show the results of the above-described test.

TABLE 1

| | | | Examples | | |
|---|---|---|---|---|---|
| | | | 1 | 2 | 3 |
| Reinforcing member for outer layer (wire diameter: mm) | | | | 0.15 | |
| <Aqueous Dispersion> | | | | | |
| FEP | | | 12.5 | 27.5 | 37.5 |
| h-BN | | | 37.5 | 22.5 | 12.5 |
| Gr | | | — | — | — |
| Surfactant | | | 5 | 5 | 5 |
| Aqueous organic solvent | | | — | — | — |
| Water | | | 45 | 45 | 45 |
| <Coating Layer of Molten Fluororesin Composition> | | | | | |
| FEP | | | 25 | 55 | 75 |
| h-BN | | | 75 | 45 | 25 |
| Gr | | | — | — | — |
| <Judgment of Abnormal Frictional Noise> | | | | | |
| 1 cycle | 500° C. | | 0.5 | 0.5 | 1.5 |
| | 400° C. | | 0.5 | 0.5 | 1.5 |
| | 300° C. | | 1 | 1 | 1.5 |
| | 200° C. | | 1 | 0.5 | 0 |
| | 100° C. | | 0 | 0 | 0 |
| 3 cycle | 500° C. | | 1.5 | 1 | 1.5 |
| | 400° C. | | 1.5 | 1 | 1.5 |
| | 300° C. | | 1.5 | 1 | 1.5 |
| | 200° C. | | 1 | 0.5 | 0 |
| | 100° C. | | 0 | 0 | 0 |
| 6 cycle | 500° C. | | 2 | 1 | 1.5 |
| | 400° C. | | 2 | 1 | 1.5 |
| | 300° C. | | 1.5 | 1 | 1.5 |
| | 200° C. | | 1.5 | 1 | 0.5 |
| | 100° C. | | 0.5 | 0 | 0 |
| 9 cycle | 500° C. | | 2 | 1.5 | 1.5 |
| | 400° C. | | 1.5 | 1.5 | 1.5 |
| | 300° C. | | 1 | 1.5 | 1.5 |
| | 200° C. | | 1 | 1 | 1 |
| | 100° C. | | 0 | 0 | 0 |
| Overall Judgment | | | pass | pass | pass |
| Amount of gas leakage (l/min) | | | | | |
| (1) | | | 0.08 | 0.08 | 0.09 |
| (2) | | | 0.13 | 0.12 | 0.16 |
| (3) | | | 0.20 | 0.18 | 0.22 |
| (4) | | | 0.28 | 0.24 | 0.28 |

TABLE 2

| | | Examples | | |
|---|---|---|---|---|
| | | 4 | 5 | 6 |
| Reinforcing member for outer layer (wire diameter: mm) | | 0.28 | 0.15 | |
| <Aqueous Dispersion> | | | | |
| FEP | | 27.5 | 11.5 | 25.0 |
| h-BN | | 22.5 | 36.5 | 20.5 |
| Gr | | — | 2.0 | 4.5 |
| Surfactant | | 5 | 5 | 5 |
| Aqueous organic solvent | | — | — | — |
| Water | | 45 | 45 | 45 |
| <Coating Layer of Molten Fluororesin Composition> | | | | |
| FEP | | 55 | 23 | 50 |
| h-BN | | 45 | 73 | 41 |
| Gr | | — | 4 | 9 |
| <Judgment of Abnormal Frictional Noise> | | | | |
| 1 cycle | 500° C. | 0.5 | 0.5 | 0.5 |
| | 400° C. | 0.5 | 0.5 | 0.5 |
| | 300° C. | 1 | 1 | 1 |
| | 200° C. | 0.5 | 1 | 0.5 |
| | 100° C. | 0 | 0 | 0 |
| 3 cycle | 500° C. | 0.5 | 1.5 | 1 |
| | 400° C. | 0.5 | 1.5 | 1 |
| | 300° C. | 0.5 | 1.5 | 1 |
| | 200° C. | 0.5 | 0.5 | 0.5 |
| | 100° C. | 0 | 0 | 0 |
| 6 cycle | 500° C. | 0.5 | 1.5 | 0.5 |
| | 400° C. | 0.5 | 1.5 | 0.5 |
| | 300° C. | 1 | 1.5 | 1 |
| | 200° C. | 1 | 1.5 | 1 |
| | 100° C. | 0 | 0.5 | 0 |
| 9 cycle | 500° C. | 1.5 | 1.5 | 1 |
| | 400° C. | 1.5 | 1 | 1 |
| | 300° C. | 1.5 | 1 | 1 |
| | 200° C. | 1 | 1 | 1 |
| | 100° C. | 0 | 0 | 0 |
| Overall Judgment | | pass | pass | pass |
| Amount of gas leakage (l/min) | | | | |
| (1) | | 0.09 | 0.08 | 0.08 |
| (2) | | 0.15 | 0.14 | 0.12 |
| (3) | | 0.26 | 0.22 | 0.20 |
| (4) | | 0.34 | 0.30 | 0.28 |

TABLE 3

| | | Examples | | |
|---|---|---|---|---|
| | | 7 | 8 | 9 |
| Reinforcing member for outer layer (wire diameter: mm) | | | 0.15 | |
| <Aqueous Dispersion) | | | | |
| FEP | | 36.5 | 27.5 | 25.0 |
| h-BN | | 11.5 | 22.5 | 20.5 |
| Gr | | 2.0 | — | 4.5 |
| Surfactant | | 5 | 5 | 5 |
| Aqueous organic solvent | | — | 5 | 5 |
| Water | | 45 | 40 | 40 |
| <Coating Layer of Molten Fluororesin Composition> | | | | |
| FEP | | 73 | 55 | 50 |
| h-BN | | 23 | 45 | 41 |
| Gr | | 4 | — | 9 |
| <Judgment of Abnormal Frictional Noise> | | | | |
| 1 cycle | 500° C. | 1 | 0.5 | 0.5 |
| | 400° C. | 1 | 0.5 | 0.5 |
| | 300° C. | 1.5 | 1 | 1 |
| | 200° C. | 0.5 | 1 | 1 |
| | 100° C. | 0 | 0 | 0 |
| 3 cycle | 500° C. | 1 | 1 | 1 |
| | 400° C. | 1.5 | 1 | 1 |
| | 300° C. | 1.5 | 1.5 | 1.5 |
| | 200° C. | 0.5 | 1 | 1 |
| | 100° C. | 0 | 0 | 0 |
| 6 cycle | 500° C. | 1 | 1 | 0.5 |
| | 400° C. | 1.5 | 1 | 1 |
| | 300° C. | 1.5 | 1.5 | 1 |
| | 200° C. | 1 | 1 | 1 |
| | 100° C. | 0 | 0.5 | 0 |
| 9 cycle | 500° C. | 1 | 1.5 | 1 |
| | 400° C. | 1.5 | 1.5 | 1 |
| | 300° C. | 1.5 | 1.5 | 1.5 |
| | 200° C. | 1 | 0.5 | 1.5 |
| | 100° C. | 0 | 0 | 0.5 |
| Overall Judgment | | pass | pass | pass |
| Amount of gas leakage (l/min) | | | | |
| (1) | | 0.08 | 0.08 | 0.08 |
| (2) | | 0.14 | 0.14 | 0.12 |
| (3) | | 0.22 | 0.22 | 0.20 |
| (4) | | 0.29 | 0.30 | 0.28 |

TABLE 4

| | | Comparative Examples | | |
|---|---|---|---|---|
| | | 1 | 2 | 3 |
| Reinforcing member for outer layer (wire diameter: mm) | | | 0.15 | |
| <Aqueous Dispersion) | | | | |
| PTFE | | 60 | 60 | 30 |
| h-BN | | — | — | 20 |
| Surfactant | | 5 | 5 | 5 |
| Aqueous organic solvent | | — | — | — |
| Water | | 35 | 35 | 45 |
| <Coating Layer of Molten Fluororesin Composition> | | | | |
| PTFE | | 100 | 100 (heated) | 60 |
| h-BN | | — | — | 40 |
| <Judgment of Abnormal Frictional Noise> | | | | |
| 1 cycle | 500° C. | 0.5 | 0.5 | 0.5 |
| | 400° C. | 0.5 | 0.5 | 0.5 |
| | 300° C. | 4 | 4 | 4 |
| | 200° C. | 4 | 4 | 3.5 |
| | 100° C. | 0 | 0 | 0 |
| 3 cycle | 500° C. | 1 | 1 | 0.5 |
| | 400° C. | 0.5 | 0.5 | 0.5 |
| | 300° C. | 3.5 | 4 | 4 |
| | 200° C. | 4 | 4 | 4 |
| | 100° C. | 0 | 0 | 0 |
| 6 cycle | 500° C. | 0.5 | 0.5 | 0.5 |
| | 400° C. | 1 | 1 | 0.5 |
| | 300° C. | 4 | 3.5 | 3.5 |
| | 200° C. | 4 | 4 | 3.5 |
| | 100° C. | 0.5 | 0.5 | 0.5 |
| 9 cycle | 500° C. | 1 | 1 | 1 |
| | 400° C. | 1 | 1 | 1 |
| | 300° C. | 4 | 4 | 3.5 |
| | 200° C. | 4 | 4 | 3.5 |
| | 100° C. | 0 | 0 | 0 |
| Overall Judgment | | fail | fail | fail |
| Amount of gas leakage (l/min) | | | | |
| (1) | | 0.09 | 0.08 | 0.08 |
| (2) | | 0.40 | 0.30 | 0.35 |
| (3) | | 0.75 | 0.80 | 0.64 |
| (4) | | 1.90 | 1.86 | 1.80 |

From the test results shown in Tables 1 to 4, it can be appreciated that the spherical annular seal members in accordance with Examples 1 to 9 are superior to the spherical annular seal members in accordance with Comparative Examples 1 to 3 in the evaluation of abnormal frictional noise and the amount of gas leakage. Since the coating layer in each of the spherical annular seal members according to Comparative Examples 1 to 3 was composed of PTFE or had PTFE as a principal component, when the coating layer underwent a temperature drop to room temperature after going through a temperature exceeding the melting point of PTFE, a phenomenon developed in which the coating layer and a film transferred onto the surface of the mating member adhered to each other, and abnormal frictional noise was recognized at a stage when a shift took place from the adhered state between the film and the coating layer to a softened state at a temperature in the vicinity of 300° C. The occurrence of abnormal frictional noise at the time of this shift from the adhered state between the film and the coating layer to the softened state is conceivably attributable to the fact that the melt viscosity ($1\times10^{10-11}$ Pa·s) of PTFE is so high that a large shearing force acts, and abnormal frictional noise is generated when the adhesion phenomenon is canceled by this shearing force, i.e., attributable to the stick-slip phenomenon which occurs due to the large difference between the coefficient of static friction and the coefficient of dynamic friction of PTFE.

In contrast, the spherical annular seal members in accordance with Examples 1 to 9 is each provided with a coating layer having as its principal component FEP having a small melt viscosity as compared to the melt viscosity of PTFE, i.e., FEP having a small difference between the coefficient of static friction and the coefficient of dynamic coefficient, so that there abnormal frictional noise attributable to the stick-slip phenomenon was not generated.

As described above, in the spherical annular seal member in accordance with the present invention, the surface of the outer layer is constituted by a smooth surface of the heated sliding layer which is integrally coated on the outer-layer intermediate layer surface of the base layer consisting of the surface of the heat-resistant material for the outer layer and the surface of the reinforcing member for the outer layer which is flush with the surface of that heat-resistant material as the heat-resistant material for the outer layer and the reinforcing member for the outer layer are pressure bonded to each other such that the reinforcing member for the outer layer is embedded in the heat-resistant material for the outer layer, the heated sliding layer having as its principal component a molten fluororesin which has a small difference between the coefficient of static friction and the coefficient of dynamic friction. Therefore, the spherical annular seal member in accordance with the present invention makes it possible to prevent the generation of abnormal frictional noise in sliding on the surface of the mating member. In addition, even in a case where the heated sliding layer has become worn away, the substrate of the heated sliding layer is the outer-layer intermediate layer surface of the base layer consisting of the surface of the heat-resistant material for the outer layer and the surface of the reinforcing member for the outer layer which is flush with the surface of that heat-resistant material, and that outer-layer intermediate layer surface is dotted with the reinforcing member. Therefore, in the friction with the mating member, direct friction with only the heat-resistant material made from expanded graphite is avoided, and the stick-slip phenomenon does not occur which is attributable to the large difference between the coefficient of static friction and the coefficient of dynamic friction of the heat-resistant material, thereby making it possible to prevent the generation of abnormal frictional noise due to the stick-slip phenomenon. Furthermore, since it is possible to avoid local friction of only the reinforcing member of the outer layer with the surface of the mating member and prevent the damaging and roughening of the surface of the mating member due to friction, it is possible to prevent a decline in sealability. In addition, since the friction takes place through the film of an appropriate thickness formed on the surface of the mating member by virtue of the action of scraping off the excessive film formed on the surface of the mating member, it is possible to prevent the generation of abnormal frictional noise.

In addition, in the method of manufacturing a spherical annular seal member in accordance with the present invention, the heat-resistant material for the outer layer made from expanded graphite having a density lower than the density of expanded graphite for forming the heat-resistant material for the spherical annular base member is inserted between two layers of the reinforcing member for the outer layer made from a metal wire net, and such a reinforcing member for the outer layer with the heat-resistant material for the outer layer inserted therein is pressurized in the thicknesswise direction of the reinforcing member, whereby the heat-resistant material for the outer layer and the reinforcing member for the outer layer are pressure bonded to each other such that the heat-resistant material for the outer layer is tightly filled in the meshes of the metal wire net of the reinforcing member for the outer layer, and the reinforcing member for the outer layer is embedded in the heat-resistant material for the outer layer. Thus, it is possible to form a flattened composite sheet in which the surface of the heat-resistant material for the outer layer and the surface of the reinforcing member for the outer layer are flush with each other, the surface of that reinforcing member for the outer layer is exposed in a dotted manner on the surface of the reinforcing member for the outer layer and the surface of the heat-resistant material for the outer layer which are made flush with each other, and the arithmetic mean roughness Ra of that surface is 5 to 30 μm. The heated coating layer of the molten fluororesin composition formed by coating with an aqueous dispersion of the molten fluororesin composition is firmly bonded to one surface of that composite sheet member.

In the outer layer formed by the composite sheet member, even in the case where the outer layer is integrally formed with the partially convex spherical surface of the spherical annular base member, its outer-layer intermediate layer surface is dotted with the reinforcing member. Therefore, even in the case where the heated sliding layer of the outer layer surface has become worn away, in the friction with the mating member, it is possible to avoid direct friction with only the heat-resistant material made from expanded graphite and avoid local friction of only the reinforcing member in the outer layer with the surface of the mating member. Hence, the stick-slip phenomenon does not occur which is attributable to the large difference between the coefficient of static friction and the coefficient of dynamic friction of the heat-resistant material (expanded graphite). Therefore, not only can the generation of abnormal frictional noise due to the stick-slip phenomenon be prevented, but also a decline in sealability can be prevented since the damaging and roughening of the surface of the mating member due to friction can be prevented as practically as possible.

DESCRIPTION OF REFERENCE NUMERALS AND SIGNS

4: belt-shaped metal wire net
5: reinforcing member
6: heat-resistant material
12: superposed assembly
13: tubular base member
23: outer-layer forming member
24: cylindrical preform
31: die
33: cylindrical inner surface
34: partially convex spherical surface
35: large-diameter side annular end face
36: small-diameter side annular end face
37: spherical annular base member
38: outer layer
39: spherical annular seal member
40: sliding layer
42: outer-layer intermediate layer surface
46: base layer

The invention claimed is:

1. A spherical annular seal member characterized by comprising: a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member, wherein said spherical annular base member includes a reinforcing member made from a metal wire net and a heat-resistant material containing expanded graphite and compressed in such a manner as to fill meshes of the metal wire net of said reinforcing member and to be integrated with said reinforcing member in mixed form, and said outer layer is comprised of a base layer which includes a reinforcing member made from a metal wire net and compressed and a heat-resistant material containing expanded graphite, compressed in such a manner as to fill meshes of the metal wire net of said reinforcing member and to be tightly pressure bonded to said reinforcing member, and having a surface which forms an outer-layer intermediate layer surface together with a surface of said reinforcing member, said base layer being formed integrally with said partial convex spherical surface, and of a heated sliding layer constituted by a molten fluororesin composition which is integrally adhered to and formed on said base layer at said outer-layer intermediate layer surface and contains at least a molten fluororesin, a surface of said outer layer exposed to an outside being constituted by a smooth surface of said heated sliding layer, and wherein said molten fluororesin is constituted by a tetrafluoroethylene-hexafluoropropylene copolymer (FEP).

2. The spherical annular seal member according to claim 1, wherein a surface of said outer-layer intermediate layer surface of said base layer formed by said reinforcing member and said heat-resistant material in said outer layer is formed with an arithmetic mean roughness Ra of 5 to 30 μm.

3. The spherical annular seal member according to claim 1, wherein said molten fluororesin composition contains 23 to 75% by mass of a hexagonal boron nitride and 23 to 75% by mass of a molten fluororesin.

4. The spherical annular seal member according to claim 1, wherein said molten fluororesin composition contains graphite at a ratio of not more than 16% by mass.

5. A method of manufacturing a spherical annular seal member including a spherical annular base member defined by a cylindrical inner surface, a partially convex spherical surface, and large- and small-diameter side annular end faces of said partially convex spherical surface, and an outer layer formed integrally on said partially convex spherical surface of said spherical annular base member, comprising the steps of:

(a) preparing a heat-resistant material for a spherical annular base member constituted by an expanded graphite sheet having a density of $\alpha$ Mg/m³;

(b) preparing a reinforcing member for said spherical annular base member made from a metal wire net which is obtained by weaving or knitting a fine metal wire, and, after forming a superposed assembly by superposing said reinforcing member for said spherical annular base member on said heat-resistant material for said spherical annular base member, convoluting said superposed assembly into a hollow cylindrical shape to thereby form a tubular base member;

(c) inserting a heat-resistant material for an outer layer constituted by an expanded graphite sheet having a density of $0.3\alpha$ to $0.6\alpha$ Mg/m³ between two layers of a reinforcing member for said outer layer made from a metal wire net which is obtained by weaving or knitting a fine metal wire, and pressurizing said reinforcing member for said outer layer with said heat-resistant material for said outer layer inserted therein in a thicknesswise direction of said reinforcing member, to thereby form a flattened composite sheet member in which said heat-resistant material for said outer layer and said reinforcing member for said outer layer are compressed so as to be pressure bonded to each other, such that said heat-resistant material for said outer layer is tightly filled in meshes of the metal wire net of said reinforcing member for said outer layer and said reinforcing member for said outer layer is embedded in said heat-resistant material for said outer layer while exposing parts thereof, said flattened composite sheet member having a surface in which a surface of said heat-resistant material for said outer layer and a surface of said reinforcing member for said outer layer are flush with each other;

(d) preparing an aqueous dispersion of a molten fluororesin composition containing a molten fluororesin powder, a hexagonal boron nitride powder, a surfactant, and water;

(e) applying said aqueous dispersion to the surface of said composite sheet member in which the surface of said heat-resistant material for said outer layer and the surface of said reinforcing member for said outer layer are made flush with each other, and drying said aqueous dispersion, to thereby form a coating layer of said molten fluororesin composition on that surface;

(f) heating said coating layer of said molten fluororesin composition formed on the surface of said composite sheet member at a temperature of not less than a melting point of a molten fluororesin, to thereby form a flattened outer-layer forming member having a heated coating layer of said molten fluororesin composition on one surface of said composite sheet member;

(g) convoluting said outer-layer forming member around an outer peripheral surface of said tubular base member with its heated coating layer facing outside to thereby form a cylindrical preform; and (h) fitting said cylindrical preform over an outer peripheral surface of a core of a die, placing the core in the die, and subjecting said cylindrical preform to compression molding in the die in an axial direction of the core, wherein said spherical annular base member is constructed so as to be provided with structural integrity as said heat-resistant material for said spherical annular base member containing expanded graphite and said reinforcing member made from the metal wire net are compressed and intertwined with each other, and said outer layer is comprised of a base layer which includes said reinforcing member made from the metal wire net and compressed and said heat-resistant material containing expanded graphite, compressed in such a manner as to fill meshes of the metal wire net of said reinforcing member and to be tightly pressure bonded to said reinforcing member, and having a surface which is flush with a surface of said reinforcing member dotted with said reinforcing member and forms an outer-layer intermediate layer surface together with that surface, said base layer being formed integrally with said partial convex spherical surface, and of a heated sliding layer obtained by heating a molten fluororesin composition which is integrally adhered to and formed on said base layer at said outer-layer intermediate layer surface, a surface of said outer layer exposed to an outside being constituted by a smooth surface of said heated sliding layer, and wherein said molten fluororesin is constituted by a tetrafluoroethylene-hexafluoropropylene copolymer (FEP).

6. The method of manufacturing a spherical annular seal member according to claim 5, wherein the density $\alpha$ of said heat-resistant material for said spherical annular base member is 1.0 to 1.5 Mg/m³.

7. The method of manufacturing a spherical annular seal member according to claim 5, wherein the aqueous dispersion of said molten fluororesin composition contains 11.5 to 45% by mass of a molten fluororesin powder, 11.5 to 45% by mass of a hexagonal boron nitride powder, 0.01 to 13.5% by mass of a surfactant, and water (25 to 45% by mass).

8. The method of manufacturing a spherical annular seal member according to claim 5, wherein the aqueous dispersion of said molten fluororesin composition contains a graphite powder at a ratio of 0.5 to 8% by mass.

\* \* \* \* \*